(12) United States Patent
Murray et al.

(10) Patent No.: US 6,353,733 B1
(45) Date of Patent: Mar. 5, 2002

(54) LATCHING MECHANISMS FOR ROTATABLE AND/OR TRANSLATABLE MEMBERS ON PORTABLE COMMUNICATION DEVICES

(75) Inventors: Matthew J. Murray, Raleigh; Scott L. Vance, Cary, both of NC (US)

(73) Assignee: Ericcson Inc., Research Triangle Park, NC (US)

( * ) Notice: Subject to any disclaimer, the term of this patent is extended or adjusted under 35 U.S.C. 154(b) by 0 days.

(21) Appl. No.: 09/301,658

(22) Filed: Apr. 28, 1999

(51) Int. Cl.[7] .............................. H04B 1/38; H04M 1/00; H04Q 1/24
(52) U.S. Cl. ..................... 455/90; 455/347; 455/550; 455/575; 379/433.13; 379/445; 343/702; 343/882
(58) Field of Search ...................... 455/90, 550, 575, 455/348, 351, 347; 379/433.06, 433.11, 433.13, 445; 343/702, 880, 881, 882, 883

(56) References Cited

U.S. PATENT DOCUMENTS

| | | | | |
|---|---|---|---|---|
| 5,274,882 A | * | 1/1994 | Persson | 16/303 |
| 5,303,291 A | * | 4/1994 | Takagi et al. | 379/433.13 |
| 5,732,135 A | * | 3/1998 | Weadon et al. | 379/433.13 |
| 5,987,122 A | * | 11/1999 | Daffara et al. | 379/433.13 |
| 6,232,924 B1 | * | 5/2001 | Winstead et al. | 343/702 |
| 6,266,542 B1 | * | 7/2001 | Stern et al. | 455/569 |

* cited by examiner

*Primary Examiner*—William Trost
*Assistant Examiner*—Rafael Perez-Gutierrez
(74) *Attorney, Agent, or Firm*—Myers Bigel Sibley & Sajovec, P.A.

(57) ABSTRACT

A portable communication device includes a rotating member and a latching mechanism which employs a magnet means and a quantity of magneto-rheological fluid ("MR" fluid) or electro-rheological ("ER") fluid therein to latch the rotatable member against the primary body of the portable communication device when a magnetic or electric field is positioned proximate to the MR or ER fluid. The rotating member can be a low-profile flip and/or antenna. The magnet means can be an electromagnetic field or at least one translatable permanent magnet. Additionally, a portable communication device with a translating antenna and an antenna receptacle and elbow also includes a quantity of magneto-rheological fluid therein. The device can also include an externally accessible latch release which controls the application of the magnetic field to the MR fluid (or electric filed to the ER fluid). Associated latching mechanisms employ rheological fluid and a magnetic or electric field source.

40 Claims, 17 Drawing Sheets

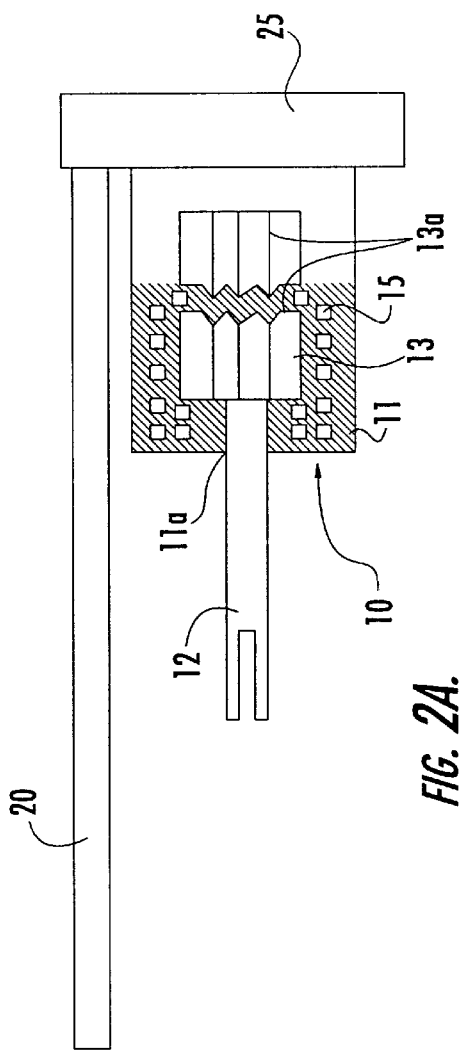
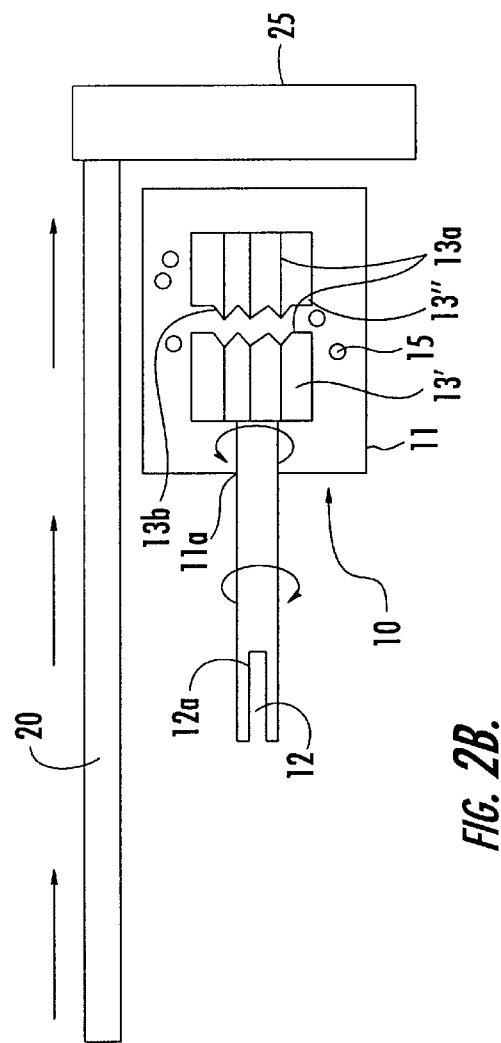
FIG. 2A.
FIG. 2B.

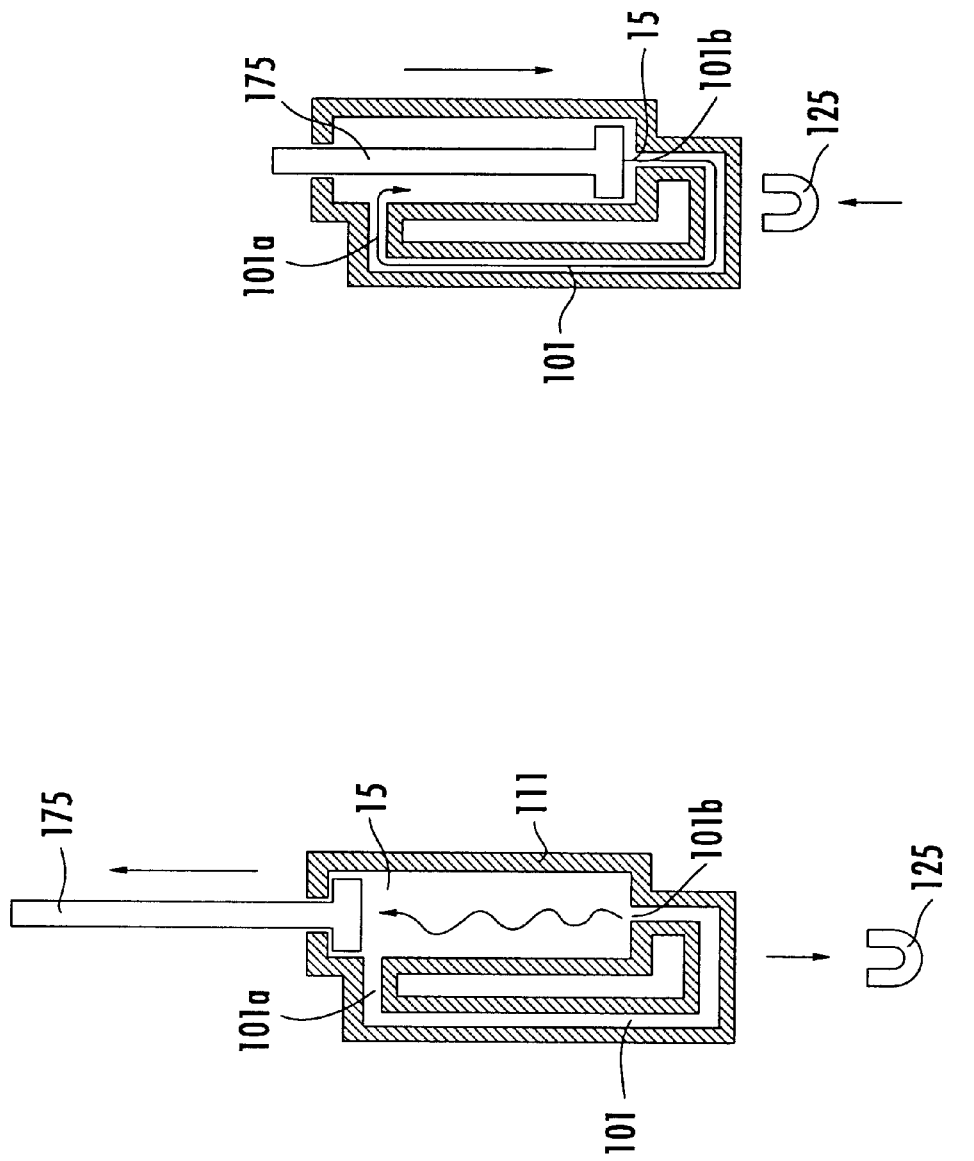

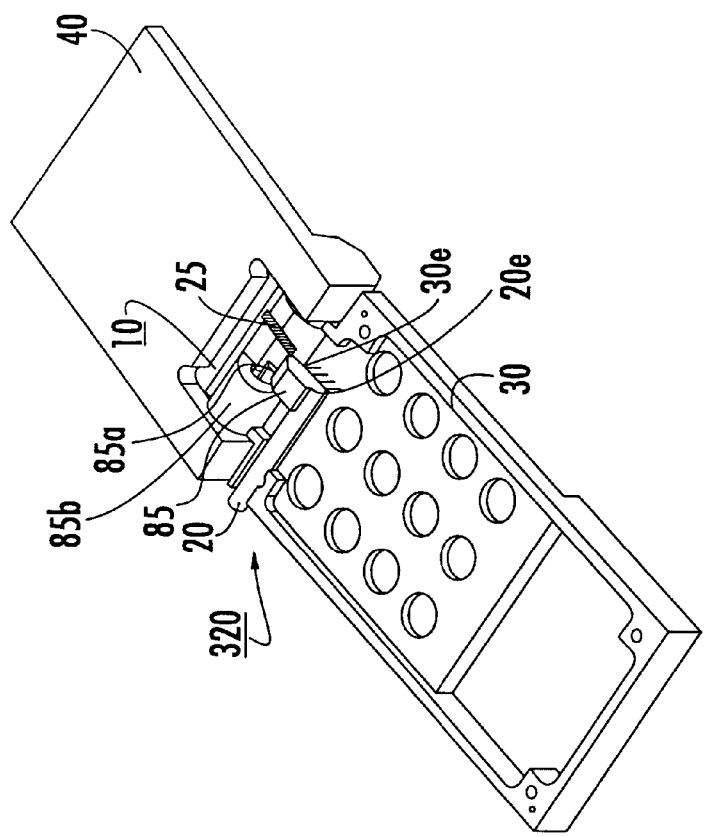
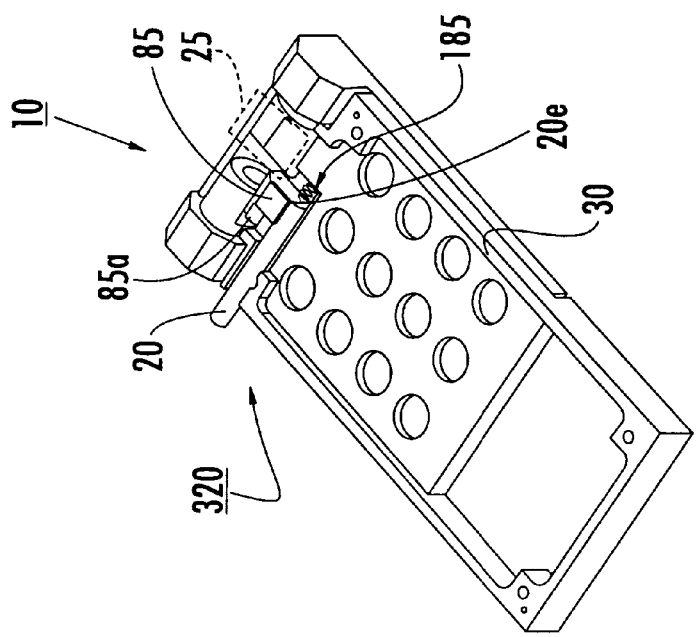

LATCHING MECHANISMS FOR ROTATABLE AND/OR TRANSLATABLE MEMBERS ON PORTABLE COMMUNICATION DEVICES

FIELD OF THE INVENTION

The present invention relates generally to latching devices for compact devices with translating components and more particularly to latching devices for translating and rotating members on pocket-sized portable communication devices.

BACKGROUND OF THE INVENTION

As a general rule, portable communication devices such as radiotelephones continue to shrink in size and to be configured in small compact packages (i.e., "pocket" sized radiotelephones). Recent radiotelephones have incorporated low profile designs. Low profile designs typically include a thin, light-weight cover member which "flips" over the radiotelephone body when the radiotelephone is closed and "flips" above and away from the radiotelephone body when the radiotelephone is opened. Consequently, this cover member is often called a "flip."

The radiotelephone also typically includes an antenna element which, during operation, extends above the radiotelephone body. Radiotelephones have conventionally used various types of translating antennas, such as side-mounted swivel antennas and telescoping antennas. In a preferred low-profile application, the antenna is configured as a flexible "blade" or "strip" (i.e., a flexible strip transmission line) radiating element which can be very narrow, thin, and flexible. The blade antenna can rotate and extend similar to the flip described above. See, co-pending and co-assigned U.S. patent application Ser. Nos. 09/217,142 and 09/217,048. The contents of these applications are hereby incorporated by reference as if recited in full herein. In any event, the antenna and flip typically stow in a retracted position proximate to (close to, inside, or adjacent) the radiotelephone body when closed.

It is desirable to configure the radiotelephone to include a latching device which can secure the translating or rotatable member(s) against the main housing when stowed to minimize unplanned deployment. It is also desirable to include a latching device which can assure that the translating or rotating member remains in the open operational position during use.

Unfortunately, the size of the user's pocket and/or a low profile radiotelephones can limit the space or area in which to fit a latching device. Indeed, many designs provide only a small volume for a latch mechanism. This small volume can reduce the robustness of a rotating but latchable hinge, especially when the latching hinge is positioned near the top of the radiotelephone. In a previous radiotelephone embodiment, a structural extended member has been configured to extend between the top and bottom of the radiotelephone to release the lock or latching mechanism to allow movement of the rotating member. However, on pocket sized radiotelephones, there is a limited amount of space available to position electrical or mechanical components (often less than 0.5 mm) around the boss of the housing to position such a flip release. Further, many flip models are relatively thin so it is undesirable to position the latching device on the flip itself. In addition, in operation, it is often ergonomically desirable to configure a latch mechanism to respond to a relatively small input force and position the latching device to be activated with easy operation (i.e., preferably single-handed engagement and disengagement).

OBJECTS AND SUMMARY OF THE INVENTION

It is therefore an object of the present invention to provide a latching mechanism which is robust, operationally easy to use, and which occupies a relatively small envelope.

It is another object of the present invention to provide a latching mechanism which can lock a rotatable member both in an open and closed position.

It is an additional object of the present invention to configure a latching mechanism such that it is operable with minimal force.

It is still another object of the present invention to provide a latching mechanism with an externally accessible lock release which can be automatically reset upon translation of the flip toward the closed position.

It is an additional object of the present invention to provide a latching mechanism for a linearly translatable antenna.

These and other objects of the present invention are provided by a latching mechanism with a cavity which includes a quantity of rheological fluid material in fluid communication therewith and a magnetic or electric field source operably associated with the rheological material. The cavity contains components (such as a rotational shaft, a linear damper, gear, clutch, or other mechanism) which translate and which contact the rheological fluid or material. The rheological material, in response to the application of the magnetic or electric field, frictionally adheres to the translating member to inhibit rotation or translation (i. e., to lock or latch the device). The magnetic field is configured to be adjustable in that it can be spatially translated away (or electrically deactivated) or translated toward (or electrically activated) the mechanism to respectively release and lock the rotating member in position. The electric field can be provided by positioning two electrodes opposing the cavity with ER material therein and electrically activating same.

More particularly, a first aspect of the invention is a portable communication device with a latching mechanism. The portable communication device includes a housing having an upper surface and a rotating member pivotably attached to the housing and a latching mechanism. The rotating member has a first closed position and a second open position. The latching mechanism is operably associated with the rotating member and is configured with a cavity. A quantity of rheological material is disposed in the cavity. (As is known to those of skill in the art, the rheological material acts as a free flowing fluid in the absence of a magnetic or electric field and acts substantially as a solid in the presence of a magnetic or electric field). The latching mechanism also includes a field source operably associated with the rheological material. The rotating member is inhibited from rotation in response to a field generated proximate to the rheological material in the cavity. The rotating member is free to rotate in the absence of a field introduced proximate to the rheological material in the cavity. In a preferred embodiment, in response to application of a magnetic field proximate to the cavity, the latching mechanism precludes rotation of the rotating member from both the first and second positions.

A second aspect of the present invention is a portable communication device with a latching mechanism. The device comprises a primary housing and a translating antenna having a stowed position and an extended position. The portable communication device also includes an antenna receptacle positioned in the housing. The receptacle defines a fluid chamber and is sized and configured to receive a major portion of the length of the antenna therein when the antenna is in a stowed position. The receptacle includes an overflow channel in fluid communication with the fluid chamber. The device also includes a quantity of rheological fluid disposed in the receptacle and a field generating means which is configured to generate a field proximate to the rheological fluid. The antenna is latched in the stowed position in response to a field generated proximate to the rheological fluid in the receptacle. Preferably, the device also includes an externally accessible latch release attached to the field generating means for controlling the introduction and removal of the field to the rheological material. Preferably, the field is a magnetic field and the rheological material is a magneto-rheological material.

Another aspect of the present invention is a latching mechanism for a translatable member. The translatable member is configured to linearly translate between retracted and extended positions. The latching mechanism includes a translatable member receptacle. The receptacle defines a fluid chamber and is sized and configured to receive a major portion of the length of the translatable member therein when the translatable member is in a retracted position. The receptacle includes a flow channel (such as an elbow) in fluid communication with the fluid chamber. As for the embodiments described above, a quantity of rheological fluid is disposed in the receptacle. The latching mechanism also includes an electric or magnetic field generating means operably associated with the electro or magneto-rheological fluid. The field generating means is configured to generate a removable field proximate to the rheological fluid such that the translatable member is latched in the retracted position in response to the electric or magnetic field generated proximate to the rheological fluid in the receptacle. Preferably, the translatable member has first and second opposing ends, and when the translatable member is in the retracted position, the channel is sized and configured to direct a quantity of the rheological fluid from below the translatable member second end to above the translatable second end.

Yet another aspect of the invention is an antenna latching mechanism for a linearly translatable antenna which is translatable between a retracted position and an extended position. The mechanism includes an antenna configured to linearly translate between retracted and extended positions and an antenna receptacle. The receptacle defines a fluid chamber and is sized and configured to receive a major portion of the length of the antenna therein when the antenna is in a retracted position. The mechanism also includes a damper having an external surface in fluid communication with the antenna receptacle. The damper has a biased first position corresponding to the substantial absence of external forces acting thereon. The damper travels inward away from the biased first position in response to forces introduced onto its external surface upon retraction of the antenna into the antenna receptacle. The mechanism also includes a quantity of rheological fluid disposed in the receptacle. The device also includes a magnetic or electric field generating means operably associated with the rheological fluid which is configured to provide a controllable field proximate to the rheological fluid. The antenna is latched in the retracted position in response to an electric or magnetic field generated proximate to the (electro or magneto) rheological fluid in the receptacle. Preferably, the antenna latching mechanism is configured with one or more of automatic deployment of the antenna toward the extended position, an externally accessible release, and an automatic magnet position reset means.

It is another aspect of the present invention to provide a deployment and latching mechanism for an antenna which uses an indirect driving means. Preferably, the mechanism includes a first rotatable gear with circumferentially extending gear teeth thereon and a longitudinally retractable and extendable antenna positioned proximate to the first rotatable gear. The antenna includes a surface which is configured to matably receive the gear teeth. The mechanism also includes a latching mechanism operably associated with the rotatable gear. The latching mechanism has a cavity and a quantity of rheological material disposed in the cavity. The device also includes one or more of a magnetic or electric field source operably associated with the rheological material. As before, the rotatable gear is inhibited from rotating in response to the magnetic field or electric field generated proximate to the rheological material in the cavity, and the rotatable gear is free to rotate in the absence of the field introduced proximate to the rheological material in the cavity. In one embodiment, the mechanism further comprises a second rotatable gear operably associated with the first rotatable gear and latching mechanism. In another embodiment, the mechanism further comprises a rotational spring having opposing first and second end portions. The first end portion is affixed to the gear, and the second end is fixed to a substantially stationary member operably associated with the latch mechanism such that the spring first end rotates corresponding to the rotation of the gear to thereby produce variable spring forces. In this embodiment, the antenna is preferably translated toward the extended position by the force attributed to the spring load exerted onto the gear by the wound rotational spring.

It is yet another aspect of the invention to provide a locking mechanism which has a user depressed release which locks a cover or flip to the housing and automatically resets the release when the cover is closed. Preferably, this locking mechanism is used to also position the magnet in the desired location for the MR latching devices described above.

In each of the embodiments, the magnetic field source or magnetic field generating means can be either one or more permanent magnets and/or an electro-magnet or electric field provided by a coil or electrodes positioned proximate to the rheological material. Further, the magneto-rheological material can alternatively be an electro-rheological material.

The present invention also includes latching mechanisms corresponding to one or more of the devices described above.

The present invention is advantageous because the separate functions of a damper and a latch can be advantageously combined into an integrated latching mechanism which can be configured to fit into a relatively small volume. The viscous material in the rotating mechanism provides a suitable damper when the flip or antenna member is deployed and then can be used to latch the member during non-deployment periods. The latching mechanism is also robust and relatively non-complex and does not require mounting or operational space on the flip itself. Further, the latching mechanism can be conveniently positioned at the top of the radiotelephone and performs the latching function in a manner which reduces the amount of force exerted on the mechanical components or needed by the user. In addition, the latching mechanism can lock the rotating member in both the open and closed positions (against the body of the radiotelephone and in the extended operational position). The rotational latch also includes an externally accessible magnet release and can also include a release or magnet reset which operates upon translation of the flip toward the main housing and automatically resets when the cover returns to a stow position.

The antenna latching mechanisms can provide latching at various antenna extensions such as in both the retracted and extended positions. In one embodiment, the latching mechanism of the present invention is configured to bias the antenna toward the operational position (i.e., facilitate automatic deployment of the antenna toward the extended position) and can also conveniently include an automatic release reset which is activated upon retraction of the antenna.

BRIEF DESCRIPTION OF THE DRAWINGS

FIG. 2A is a schematic illustration of the latching mechanism in FIG. 1, showing the magneto-rheological fluid in substantially solid form (i.e., in crystalline alignment) in response to the magnet positioned adjacent the fluid.

FIG. 2B is a schematic illustration of the latching mechanism in FIG. 2A, in which the magneto-rheological fluid is in the fluid phase and the shaft is free to rotate in response to the displacement of the magnet away from the cavity.

FIG. 8A illustrates the magnetic field applied to lock the antenna in a retracted position and FIG. 8B illustrates the removal the magnetic field and the released translation of the antenna into an extended position.

FIG. 8D illustrates the magnetic field applied to lock the antenna in a retracted position and FIG. 8C illustrates the release of the antenna to allow the antenna to translate to an extended position upon removal or displacement of the magnetic field.

FIGS. 9A and 9B are schematic illustrations of a latching mechanism of the present invention showing a flow path for the magneto-rheological fluid in response to the translation of the antenna.

FIGS. 11A and 11B are schematic illustrations of a latching mechanism having an automatic latch reset or release feature in which the release lever is reset as the cover advances to its closed position.

DETAILED DESCRIPTION OF PREFERRED EMBODIMENTS

Figure 1:
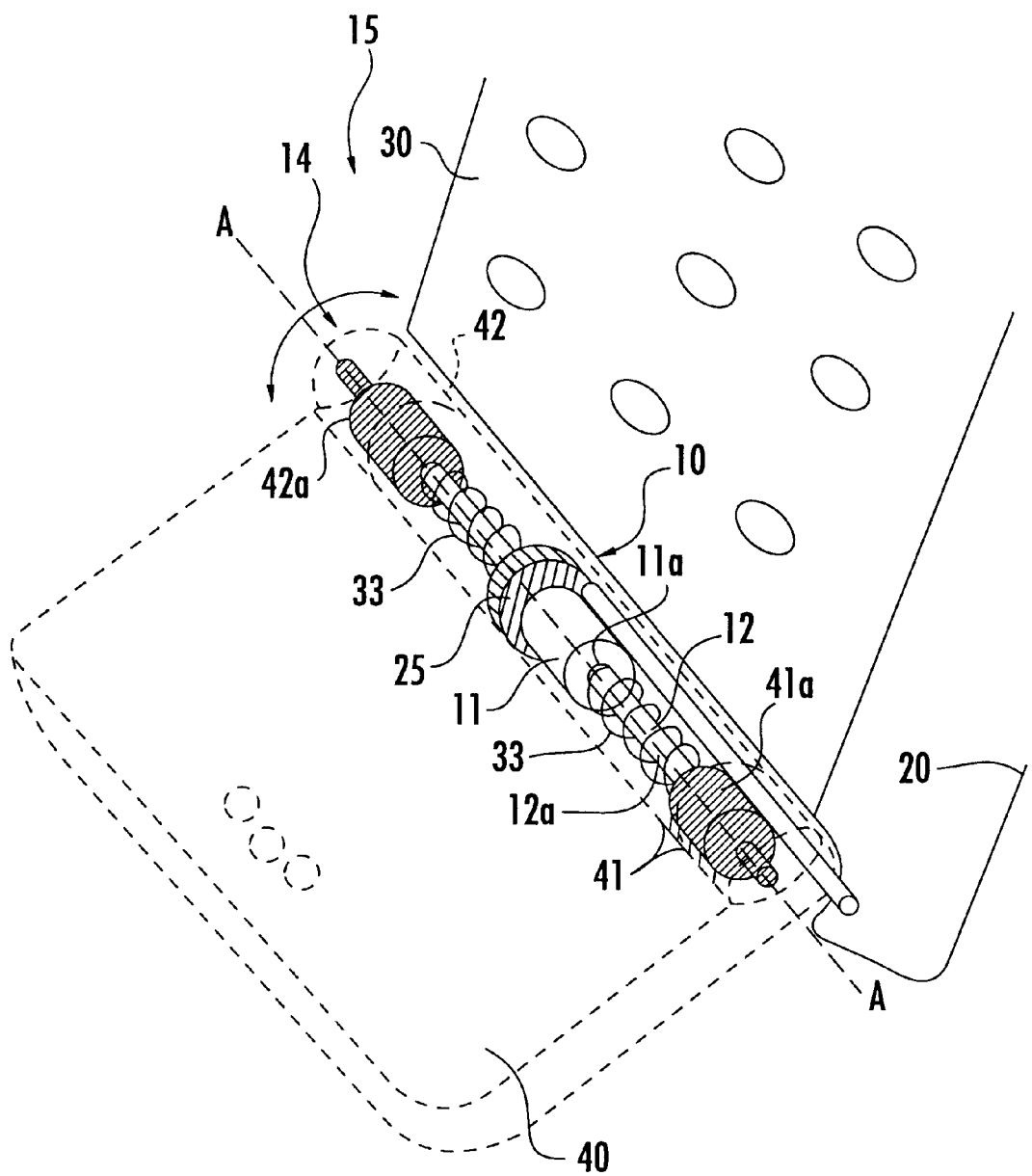
FIG. 1 is an enlarged perspective partial cutaway view of a latching mechanism for a rotating cover mounted on a portable radiotelephone according to one embodiment of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout. In the drawings, layers and regions may be exaggerated for clarity.

Referring now to FIG. 1, a latching mechanism 10 positioned in a hinging portion 14 of a portable communication device such as a radiotelephone 15 is shown. The radiotelephone 15 includes a housing 30 and a flip 40 which rotates to extend away from the radiotelephone housing 30 during use. As shown, the hinging portion 14 of the radiotelephone pivotably connects first and second arms 41, 42 of the flip cover 40 to a central portion 43 (as illustratively shown in FIGS. 4 and 7A) of the housing 30, allowing the flip 40 to pivot relative to a pivot axis "A" defined along one end of the housing 30. As such, the hinging portion 14 includes a pair of hinging pins 41a, 42a which are attached to the respective arms 41, 42. Of course, the pivotable connection of the housing 30 and flip 40 can be made in a number of ways as will be appreciated by one of skill in the art. See, e.g., U.S. Pat. No. 5,732,135 to Weadon et al., U.S. Pat. No. 5,274,882 to Persson, and U.S. Pat. No. 5,303,291 to Tagaki et al. The contents of these documents are hereby incorporated by reference as if recited in full herein.

Figure 2C:
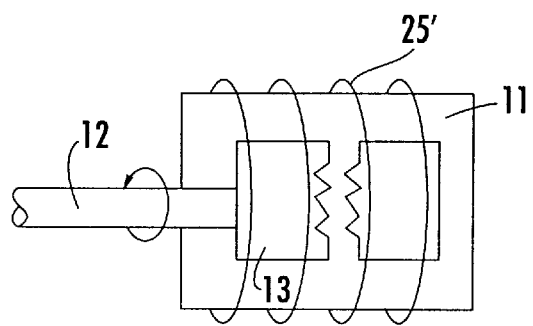
FIG. 2C is a schematic illustration of an alternate embodiment for the magnetic field source shown in FIGS. 1, 2A, and 2B, with an electromagnetic field positioned proximate to the magneto-rheological fluid in a cavity. As such, electrical current introduced to a proximately located electrical coil can be removed or applied to provide the desired magnetic field.

The latching mechanism 10 includes an enclosed cavity 11 and a laterally extending rotatable shaft 12. The latching mechanism 10 also includes a permanent magnet 25 which translates away from the cavity 11 in response to an externally accessible release 20. The magnet 25 is included to provide a magnetic field proximate to the cavity 11. Of course, the magnetic field can be provided by other magnetic field sources, such as other arrangements of permanent magnets or by electro-magnets (FIG. 2C). As shown in FIG. 2C, the magnetic field source is a wire coil 25' which is proximately positioned adjacent the cavity 11 with an electrical path which is preferably connected to a microcontroller in the radiotelephone (not shown). To activate the electromagnet coil 25', current is introduced thereto.

The shaft 12 is anchored to at least one internal rotational member 13 (FIGS. 2A, 2B) which is disposed inside the cavity 11. A quantity of magneto-rheological fluid 15 (FIGS. 2A, 2B) is positioned inside of the cavity 11. The cavity 11 is sealed at the upper portion 11a to prevent the escape of the magneto-rheological fluid therefrom.

"Rheological Materials" includes fluids having a controllable viscosity which are responsive to an applied magnetic or electric field. As used herein, "Rheological Materials" includes Magneto-rheological ("MR") materials and Electro-rheological ("ER") materials. MR materials are typically suspensions of micron sized, magnetizable particles in a liquid such as oil. In the absence of a magnetic field, the MR material is a free-flowing liquid with a consistency similar to motor oil. However, exposure to a magnetic field can quickly transform the MR material from a free flowing material to a near solid or viscous paste-like consistency (usually the transformation is on the order of milliseconds). The transformation is attributed to the alignment of the particles upon exposure to a magnetic field to form a dense network of particle chains. Similarly, ER materials are particularly suitable for use with application of electric fields (i.e., which respond to electric fields). Typically, a pair of spaced apart electrodes may be included in close proximity to (typically positioned on opposing sides of) the ER material for applying or generating an electric field of predetermined strength to the ER material. Magneto-rheological fluids are generally known as disclosed in U.S. Pat. Nos. 5,257,681; 5,284,330; 5,277,281; 5,167,850, 4,992,190, the disclosures of which are incorporated by reference as if recited in full herein. Electro-rheological fluids are also generally known as disclosed in U.S. Pat. Nos. 4,923,057; 5,087,382; 5,075,023; and 5,139,691, the disclosures of which are incorporated by reference as if recited in full herein. A suitable MR material is available from Lord Corporation in Cary, N.C. under the name of RHEON-ETIC™ magnetic fluids.

In order to latch the cover 40 or rotatable member to the housing 30, the latch mechanism 10 is configured such that it is fixedly attached to a hinging portion of the cover. For example, as shown, the shaft 12 is affixed to one of the cover arms 41. In this way, the cover 40 rotates according to the free rotation of the shaft 12. Similarly, the cover 40 is latched or precluded from rotation when the shaft 12 is locked into position by the anchor member 13 (FIG. 2A). Stated differently, and as shown in FIG. 2A, when the MR material 15 is exposed to the magnetic field (i.e., the magnet 25 is positioned to adjacent to and preferably in contact with the cavity 11) the MR material 15 particles align, which transforms the MR material 15 into a very viscous fluid or near solid. This transformed material then frictionally engages or adheres to the anchor member 13 to inhibit or stop free rotation of the shaft 12, thereby "latching" the cover 40 to the housing 30. In contrast, as shown in FIG. 2B, when the magnet 25 is translated a distance away from the cavity 11, the MR material 15 is substantially a free flowing fluid with non-aligned magnetic particles (which acts much like lubrication oil) which facilitates free rotation of the shaft 12.

Figure 7A:
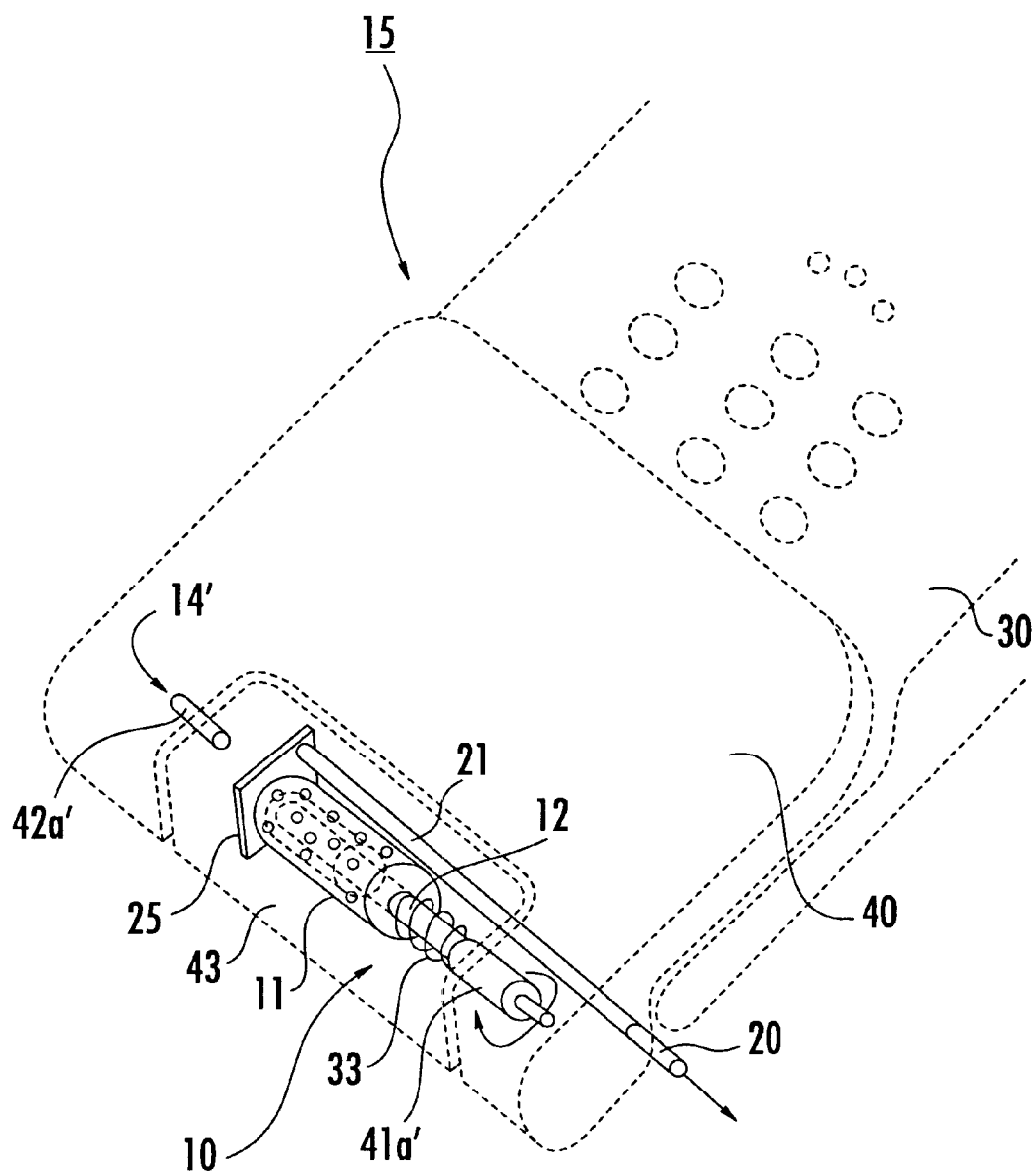
FIG. 7A is an enlarged perspective cutaway view of a radiotelephone according to an alternate embodiment of the present invention with a latching mechanism and externally accessible release with a permanent magnet proximately positioned thereby to latch the cover to the body of the radiotelephone.

As such, as shown in FIG. 1, the latching mechanism 10 is configured to attach to at least one portion of the pivoting body (as shown the cover 40) to control rotation of the hinging portion 14 relative thereto. As shown, the first arm pin 41a is fixed to the first arm 41 of the cover and is also keyed to the shaft 12a such that the 40 rotates corresponding to the rotation of the shaft 12. The second arm 42 may include any type of pivoting connector. Preferably, as shown in FIG. 1, at least one laterally extending spring 33 is configured to provide a pre-loaded hinging portion to facilitate the secure mounting and responsiveness of the cover 40 relative to the body 30. FIG. 1 shows the hinging portion 14 with two pre-loaded springs 33, one each positioned adjacent a separate cover arm 41, 42 and the respective adjacent portion of the center body portion. FIG. 7A illustrates one spring 33 and a different hinging portion 14' (i.e., a different pivot arrangement).

As discussed above, FIGS. 2A and 2B illustrate the latching mechanism 10 activated or deactivated corresponding to the translation of the magnet 25 either close to or away from the MR material in the cavity 11. In a preferred embodiment, the anchor member 13 includes frictional surfaces 13a thereon. These frictional surfaces 13a provide increased surface area. In addition or alternatively, the frictional surfaces 13a may be shaped to provide increased surface area which is exposed to the MR material (and/or the frictional surfaces 13a can be textured). In any event, the frictional surfaces 13a can provide additional gripping surfaces for the aligned particles of the MR material to abut and frictionally engage. As such, the frictional surfaces 13a can provide increased locking strength for the anti-rotation latch mechanism 10. As is also shown, the anchor member 13 is a two piece member 13', 13" with gear teeth 13b disposed therebetween. Preferably, the shaft 12 is attached to both of the two members 13', 13" and the two members 13', 13" are positioned such that, upon transformation of the MR material 15, the two members 13', 13" are locked together via the aligned material positioned between the gear teeth surfaces 13b to preclude rotation of the members relative to the other and to thereby prevent the shaft 12 from rotating.

Figure 5:
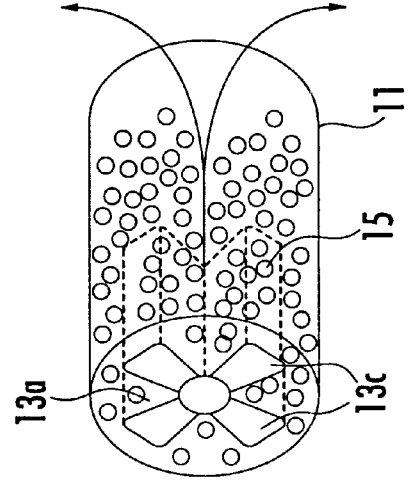
FIG. 5 is a schematic illustration of a radiotelephone latching mechanism illustrating the magneto-rheological material in the cavity of the latching mechanism and the preferred orientation of the magnetic field.
Figure 6A:
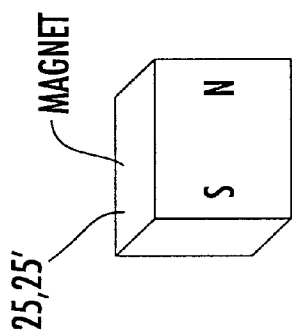
FIG. 6A is a schematic illustration of the latch mechanism of FIG. 5 showing the crystalline alignment of the magneto-rheological material in response to the proximate application of the magnetic field.
Figure 6B:
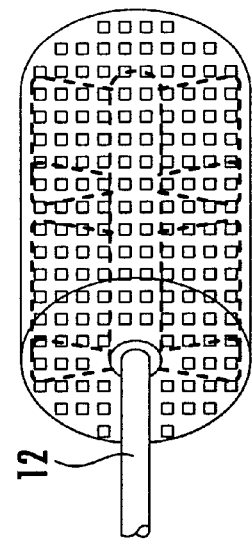
FIG. 6B is an end view of the latching mechanism of FIG. 6A showing a preferred orientation of frictional surfaces.

FIGS. 5, 6A, and 6B illustrate another embodiment of an anchoring member 13 with frictional surfaces 13a formed to resemble a three-dimensional fan blade 13c configuration. FIG. 5 also illustrates a preferred magnetic field pole orientation with respect to the direction of the magnetic particle or crystalline alignment.

Figure 7B:
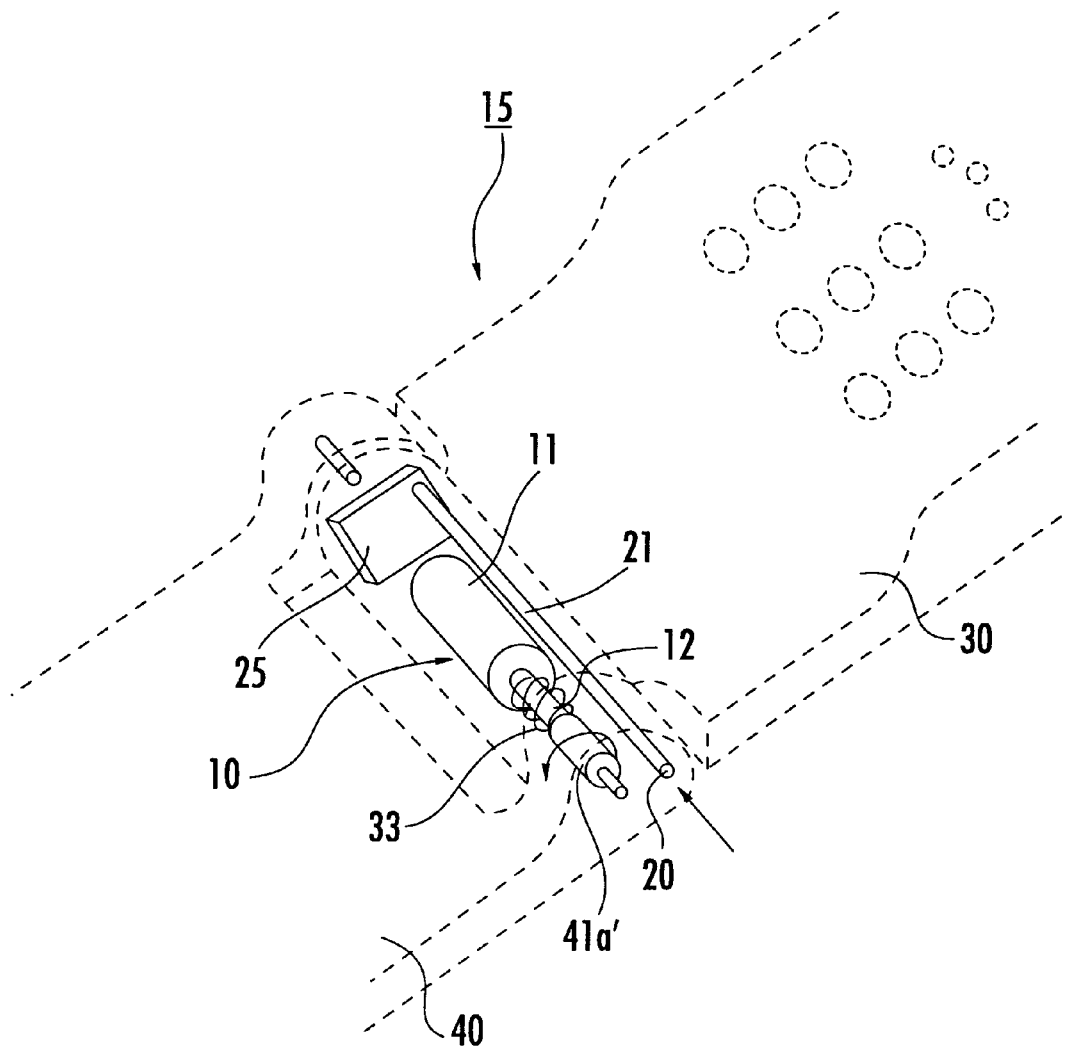
FIG. 7B is an enlarged perspective cutaway view of the latching mechanism of FIG. 7A with the magnet laterally translated away from the magneto-rheological material thereby allowing the cover to freely rotate.

FIGS. 7A and 7B illustrate the latched and unlatched position of a latching mechanism 10 according to another preferred embodiment of the instant invention.

FIG. 7A illustrates the externally accessible release 20 in a non-activated (i.e., not depressed) position. As such, the magnet 25 is positioned adjacent the bottom of the cavity 11 such that it abuts the cavity 11. The MR material 15 is therefore exposed to a magnetic field and the MR material 15 acts to prevent the shaft 12 from rotating, thereby latching the cover 40 to the housing 30.

Figure 4:
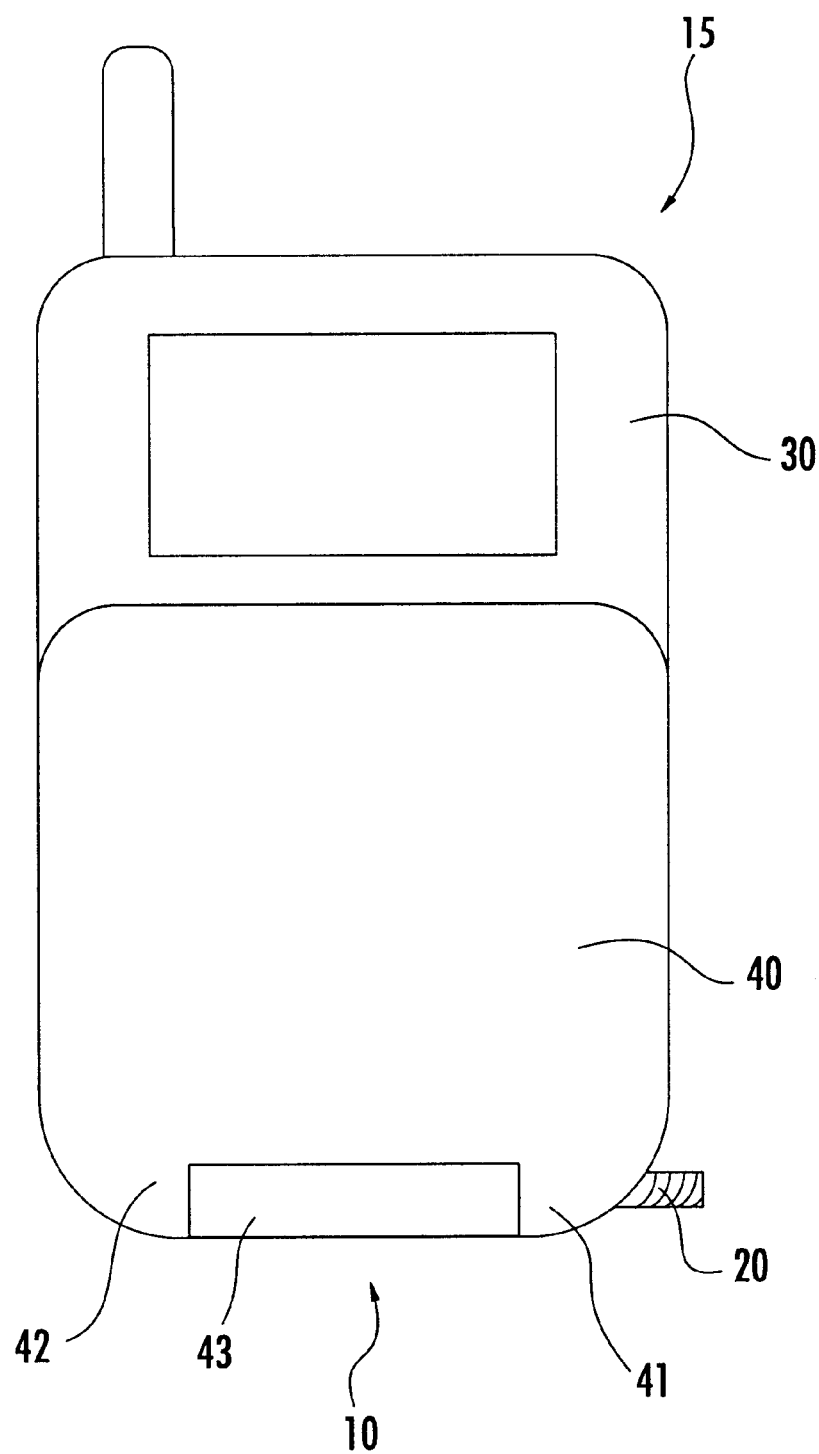
FIG. 4 is a front view of a pocket radiotelephone according to the present invention with an externally accessible release mounted to the bottom of a side edge portion of the radiotelephone housing.

In contrast, as shown in FIG. 7B, when the release 20 is depressed, it moves the magnet 25 away from the cavity 11 and the MR material 15 therein. In this embodiment, as is also shown in FIG. 4, the release 20 is positioned at the bottom portion of one side of the radiotelephone 15 and is configured to be accessible by a user for easy deployment (also allowing for single hand operation) of the latching mechanism 10. The magnet 25 is connected to the release 20 via a laterally extending pin 21. In operation, when the release 20 is depressed, the magnet 25 moves away from the cavity 11. Although the release 20 is shown as positioned at the top of the radiotelephone, it can be alternatively positioned. For example, for flips which pivot relative to the top of the radiotelephone, the release is preferably positioned at the bottom.

Figure 10:
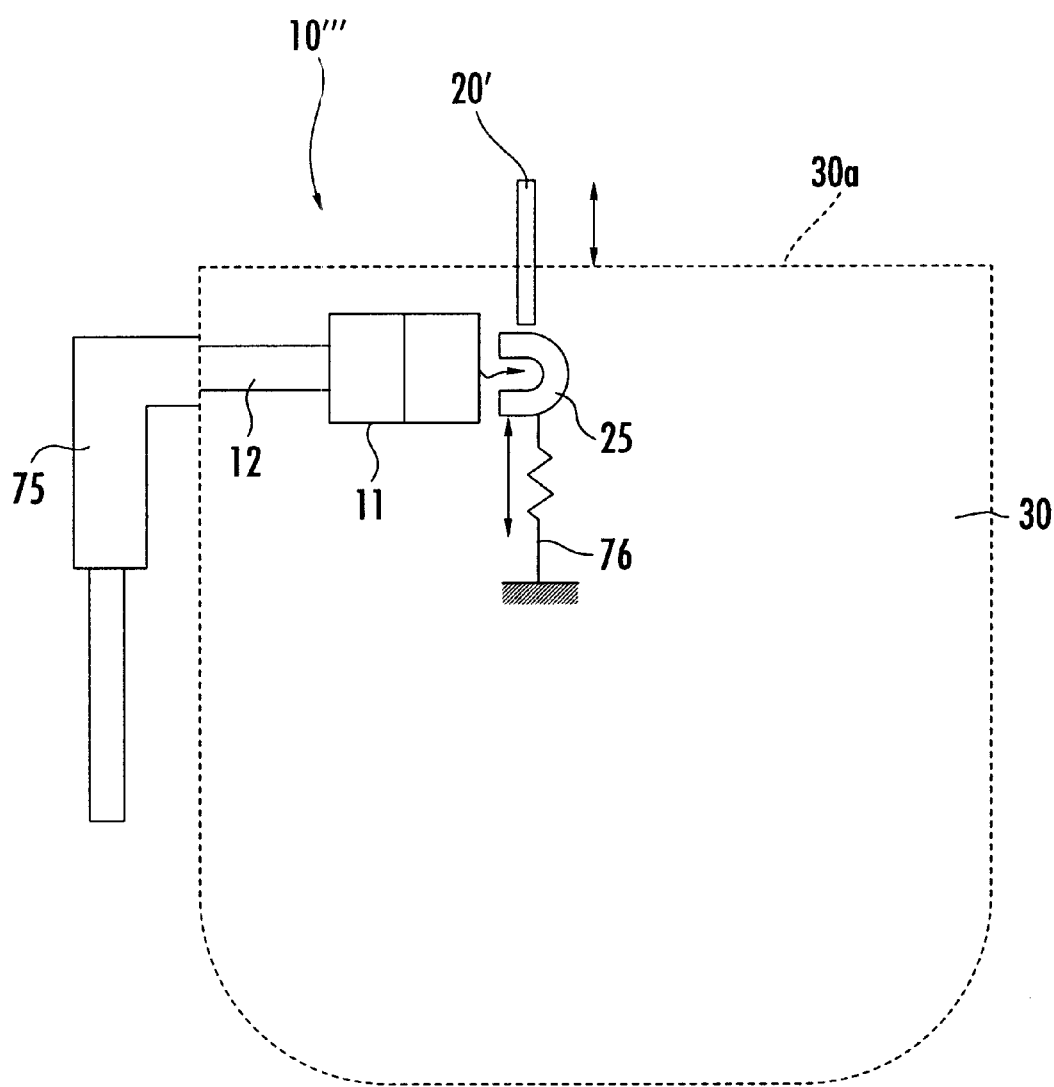
FIG. 10 is a schematic illustration of an alternate embodiment of a latching mechanism for a pivoting or rotatable and extendable antenna. As shown, the latching mechanism also includes an intermediately positioned externally accessible magnet release.

Alternatively, as shown in FIG. 10, the release 20 can be configured on the top edge 30*a* of the radiotelephone 15 as an intermediately positioned release 20'. In this embodiment, the release 20' is depressed and the magnet 25 is translated a longitudinal distance away from the cavity 11 of the latching mechanism 10'''. As shown in FIG. 10, this latching mechanism 10''' can be used to lock a rotatable antenna 75 in a stow position adjacent a side of the radiotelephone 15. Further, this embodiment can easily be reversibly deployed to lock the antenna 75 upright in an extended operation by simply retracting the release 20'. Thus, in operation upon retraction of the release 20', the magnet 25 (which, as shown, is preferably pre-loaded with a spring or other resilient member 76) is biased to return to a location proximate to the cavity 11. Preferably, the bias or pre-loading of a biasing member such as a spring is configured to bias the member in a direction which is generally away from the body of the radiotelephone. This bias can facilitate rapid deployment of the rotating member (such as a flip) when a call is incoming and allows for a manual reset after the active call use (when time is typically less critical for a user).

Figure 3:
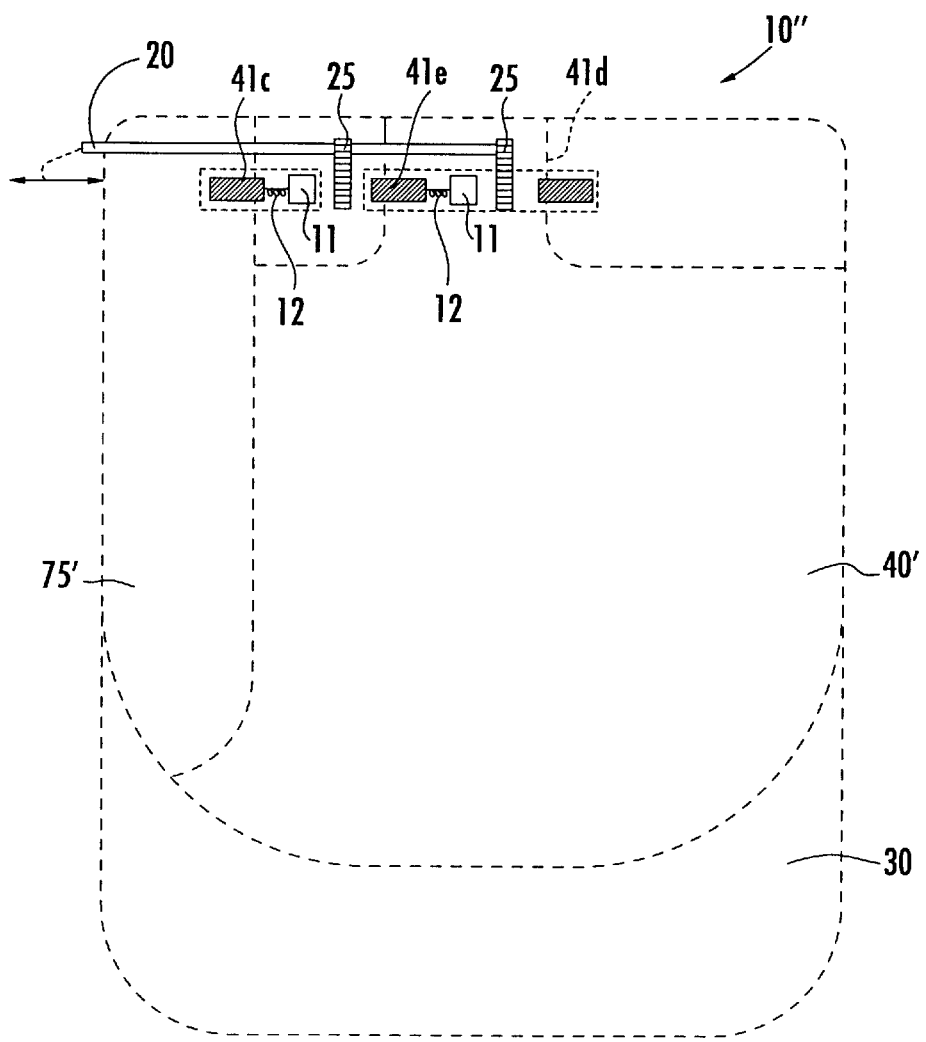
FIG. 3 is an enlarged perspective cutaway view of an alternate embodiment of a latching mechanism with a top mounted release and which can separately latch two rotating members, a blade antenna, and a flip, according to the present invention.

FIG. 3 illustrates a dual-hinge or pivot latching mechanism 10'' which can provide dual locking features for a cover with two pivoting members (i.e., a flip and blade latching mechanism). As shown, the radiotelephone 15 includes a pivotable flip 40' and a pivotable blade antenna 75', each having hinging portions, 41*c*, and 41*d*, 41*e* respectively. The latching mechanism 10'' includes two magnetic field sources (shown as permanent magnets 25), two shafts 12 with corresponding anchor members 13, and cavities 11 with MR material therein. Advantageously, upon depression of the release 20, the magnets 25 are both translated away from their respective cavities 11 allowing each rotating member 40', 75' to be unlocked and free to rotate or deploy.

FIGS. 11A and 11B illustrate an automatic release 320 reset configuration. The cover or flip 40 is not shown in FIG. 11A for clarity of discussion. Similarly, the magnet latching mechanism 10 is generally referred to (and its general position indicated), but is not shown in these figures. As shown in FIG. 11A, the release 20 includes an inner end portion with an upwardly extending locking component 85 which is sized and configured to be received into a mating slotted aperture 85A formed in a portion of the cover 40. The release 20 and associated locking component 85 are biased to want to return the release 20 to the non-activated position (a direction away from the inside of the telephone). Preferably, a spring 185 is positioned to push against the inner end of the release 20*e* to bias the release toward the non-depressed position. As also shown, the slotted aperture 85A is fixed to the cover 40 and rotates away from the locking component 85 corresponding to the opening of the cover 40.

In operation, when the cover is closed, the locking component 85 is received into the slotted aperture 85A and the magnet 25 is positioned proximate to the latching mechanism 10. The cover is thus locked in the closed position. Upon depression of the release 20, the locking component 85 is transversely displaced out of the slotted aperture 85A in a direction opposing the bias direction and the magnet 25 is moved away from the latching mechanism 10. As the cover 40 pivots upward and away from the closed position, the slotted aperture 85A turns and the locking component 85A is held (stationary or fixed) between the non-slotted pivot 85B area of the cover (or hinge) and the housing 30. The spring 185 is thus compressed between the end of the release 20*e* (or the locking component 85) and the housing region 30*e* abutting same. In reverse, as the cover 40 advances towards the closed position to overlay the housing 30, the slotted aperture returns to align with the locking component 85 and the spring loading forces the locking component 85 to enter the slotted aperture 85A. The reset 20 is thus returned to a non-deployed position and the magnet 25 is returned to be positioned proximate to the latching mechanism 10 to thereby lock the cover in the closed position. Of course, the locking component configuration shown in FIGS. 11 and 11A could also be used as a latch for a flip or other rotating member for a radiotelephone or the like without the magneto-rheological latching device.

Figure 8B:
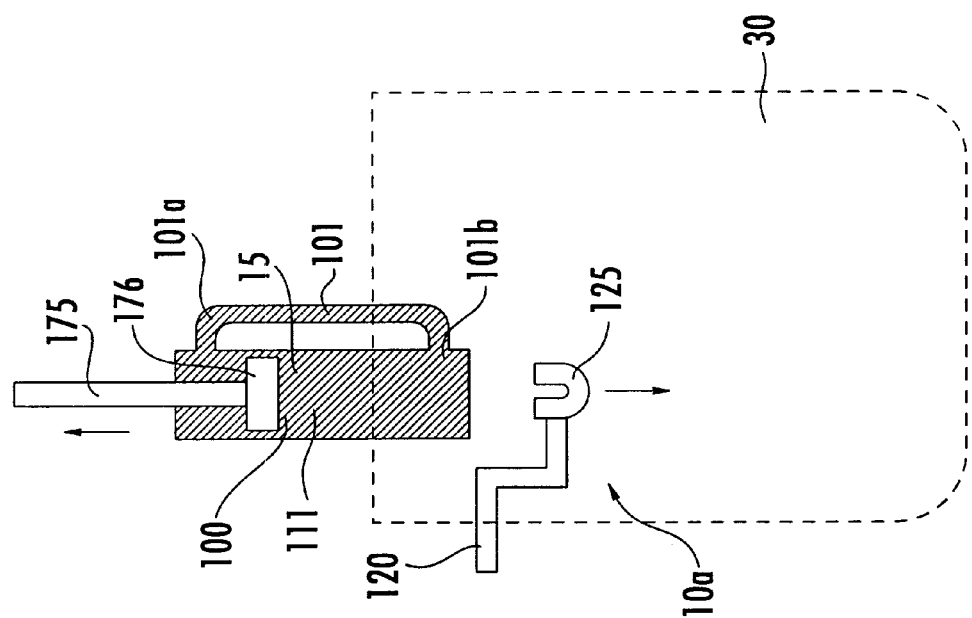
FIGS. 8A and 8B are schematic illustrations of an additional embodiment of a latching mechanism according to the present invention. As shown, the latching mechanism is used to latch and release a linearly translating antenna.
Figure 8A:
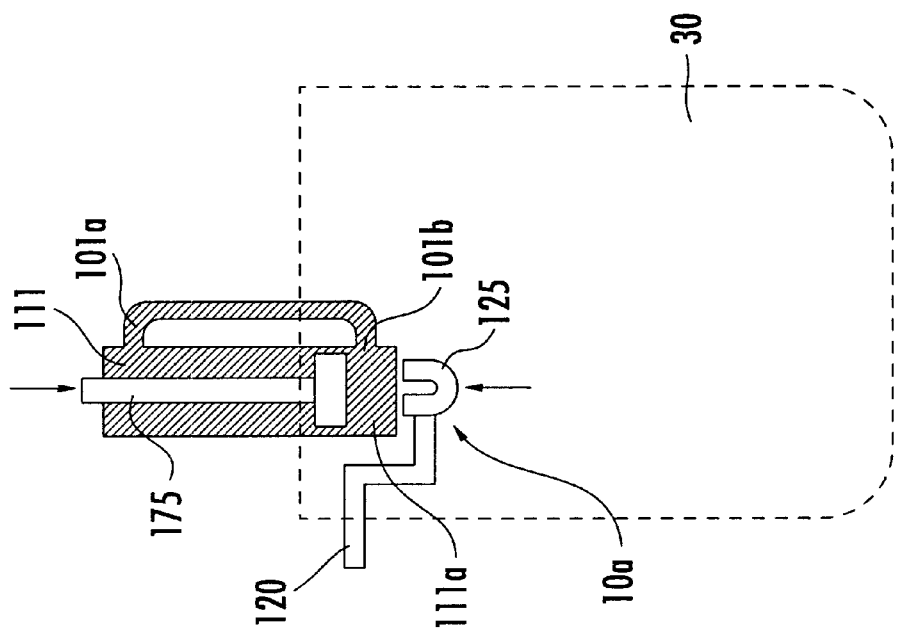

Turning now to FIGS. 8A and 8B, an additional preferred embodiment of the present invention is shown. In this embodiment, the latching mechanism 10*a* includes an antenna receptacle 100 with a cavity 111 which is sized and configured to receive a linearly translating antenna 175 and a quantity of MR fluid 15. The antenna receptacle 100 includes an overflow path 101 to contain and direct MR fluid 15 which is compressed into the bottom portion of the cavity 111 during the retraction of the antenna 175 as will be discussed further below. The antenna 175 includes a bottom anchor portion 176 which is retained inside the cavity 111 irrespective of the retracted (stowed) or extended (operational) position of the antenna 175. The latching mechanism 10*a* also preferably includes a side-slotted release 120 which is configured to longitudinally translate relative to a slotted opening (not shown) formed in the housing 30 and to provide an externally accessible release 120. The overflow channel 101 is preferably configured with respect to the cavity 111 such that the top of the channel 101*a* is above the fully extended position of the anchor portion of the antenna 175 and the bottom of the channel 101*b* is below the fully retracted position of the anchor portion of the antenna 175.

In operation, as shown in FIG. 8A, the magnet 125 is positioned adjacent the cavity 111 of the antenna receptacle 100 and the MR fluid 15 transforms as noted above to lock the antenna 175 in the retracted position in the cavity 111 of the antenna receptacle 100. As the side-mounted release 120 moves downward, the magnet 125 longitudinally translates away from the cavity 111. The MR fluid 15 returns to a substantially free-flowing fluid state and the antenna 175 is then free to extend out of the cavity 111.

As shown, the overflow path 101 is in fluid communication with the cavity 111. The overflow path 101 includes an upper portion 111*a* and a bottom portion 101*b*, each of which is connected to the receptacle 100 (preferably directly connected to the cavity 111). FIGS. 8A and 8B show the bottom portion of the overflow path 101*b* formed as an opening on a bottom portion of the cavity 111*a*. FIGS. 9A and 9B show the bottom of the overflow path 101*b* formed as an opening in the bottom of the cavity 111*a*. In any event, as shown in FIGS. 9A and 9B, it is preferred that the bottom portion of the flow path 101*b* be positioned relative to the cavity 111 such that upon retraction of the antenna 175 within the cavity 111, the flow path 101 can direct the excess material out of the retraction path and redirect the material over the top of the bottom anchor portion of the antenna 175. In this way, the MR material 15 can be exposed to the magnetic field and the antenna 175 locked into the retracted position with MR material 15 disposed both above and below the anchor portion 176. As noted above in the rotational latch mechanism, it is preferred that the anchor portion 176 be configured with frictional surfaces to enhance engagement with the transformed MR fluid 15.

Figure 8D:
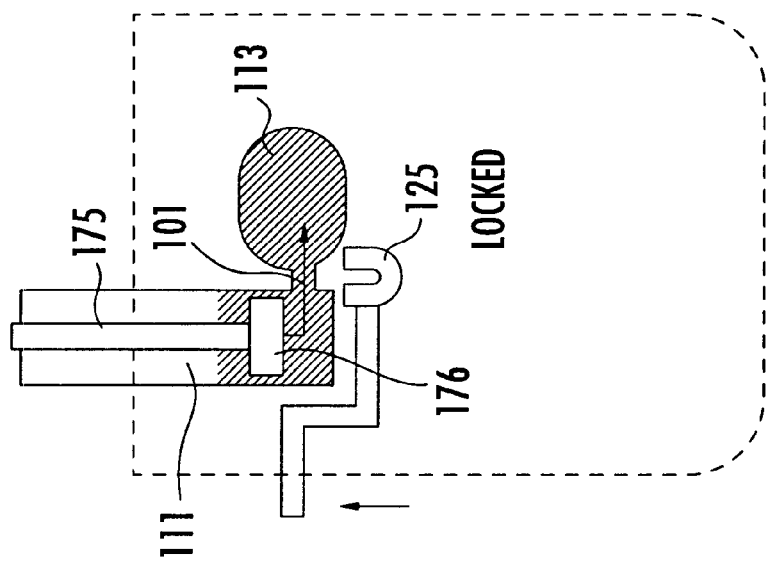
FIGS. 8C and 8D are schematic illustrations of-yet another latching mechanism according to the present invention.
Figure 8C:
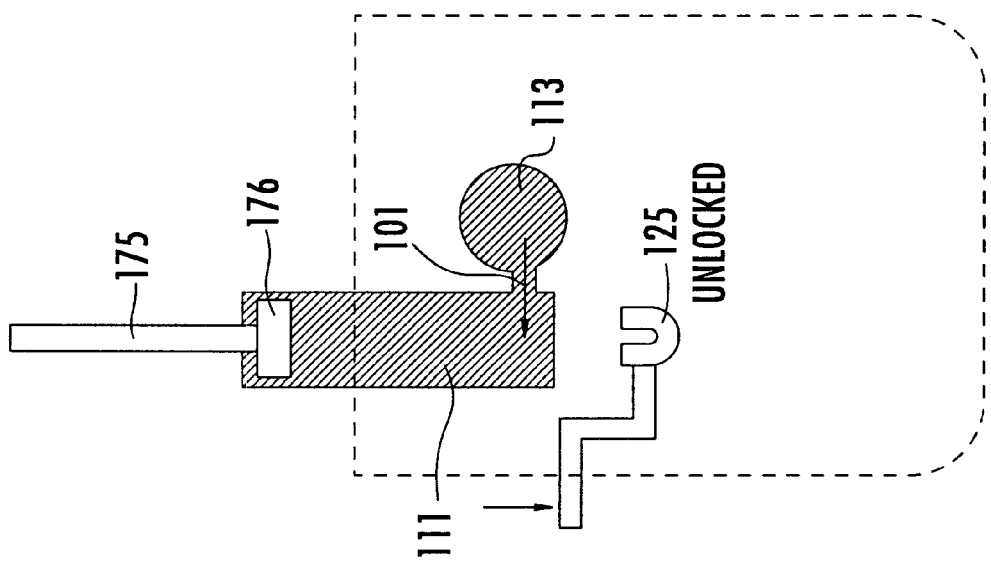

FIGS. 8C and 8D show an alternative overflow channel configuration. As shown, the channel 101 is in fluid communication with a reservoir 113 sized and configured to receive the excess MR fluid therein when the antenna is retracted within the cavity 111. Indeed, the reservoir 113 can be formed from a resilient material or configured as a resilient body to expand and deflate corresponding to the amount of material received therein. Additionally, or alternatively, the reservoir 113 can be configured with a nozzle (not shown) pointed toward the cavity 111 which pressurizes the chamber to pre-dispose the reservoir to expel the MR material toward the antenna during non-locked operation. In reverse, the retraction force of the antenna anchor portion 176 can force the material into the reservoir.

In operation, for embodiments similar to those shown in FIGS. 8 and 9, the damping is indirectly provided (i.e., without a physical conventional damper) by the length, geometry, and width of the channel 101 in conjunction with the viscosity of the fluid used therein. The damping attributed to this indirect configuration can be adjusted depending on the characteristics of the channel and the fluid. For example, by increasing the curvature and/or length of the channel 101, or by reducing the diameter or width, the damping can be increased. Similarly, the damping force attributed to this configuration can be increased by increasing the viscosity of the fluid.

Preferably, the overflow path or channel 101 and the receptacle 100 are sized and configured to hold a quantity of MR fluid 15 which will facilitate the advancement of (i.e., bias) the antenna 175 toward the extended position. In one embodiment, as shown in FIG. 8B, the MR fluid 15 is disposed in an amount sufficient to substantially fill the cavity 111 when the antenna 175 is extended and the magnet 125 is removed. This cavity-sized quantity of MR fluid 15 can alternatively or also be used to lock the antenna 175 in the extended position (or at variable extensions) by merely exposing the MR fluid 15 to a magnet 125 to transform the material and thereby inhibit translation of the antenna 175. Of course, as noted above, the magnetic field generated by the permanent magnet 175 can be alternatively generated by an electromagnet such as a coil segment positioned over the exterior of one or more of the receptacle adjacent the cavity 111 and the flow path 101 (not shown). In addition, the permanent magnet 125 can be alternatively configured such as a cylindrical magnet shell (not shown) which can be positioned around all or portions of the perimeter of the cavity 111 or opposing sides which form opposing walls (not shown) to direct the magnetic field about preferred portions of the cavity 111.

Figure 12:
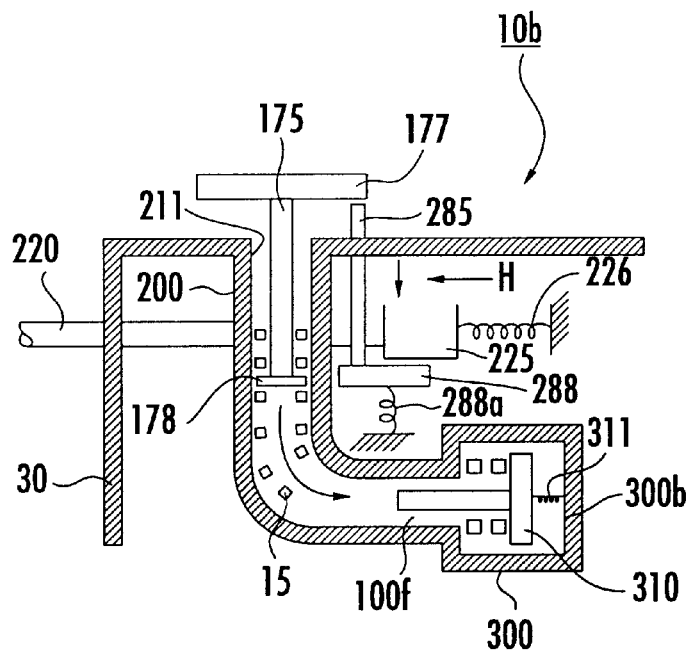
FIGS. 12 and 13 are sectional views of an alternate embodiment of an antenna latching mechanism with automatic deployment according to the present invention.
Figure 13:
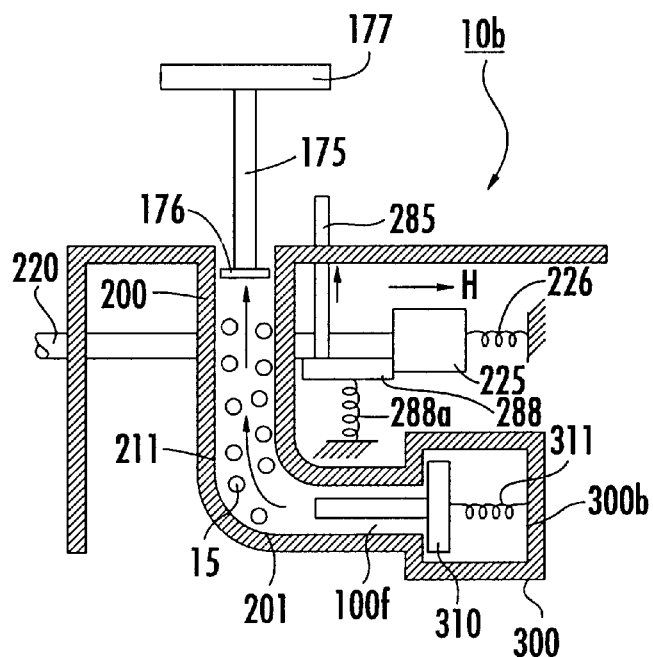

FIGS. 12 and 13 illustrate an automatic antenna deployment latch configuration 10b (as well as a two-way locking configuration) which biases the antenna 175 toward the extended position. Stated differently, the antenna 175 can be automatically biased to translate toward the extended position upon relocation of the magnet 225 away from the proximity of the MR fluid 15. Further, the antenna 175 can be easily locked in both the retracted position and the extended position by applying the magnetic field to the MR fluid 15.

In this embodiment, a spring-loaded cylinder 300 with a diaphragm plunger 310 is positioned at the bottom of the receptacle flow path 100f as shown. The plunger 310 is configured such that it is biased toward a first position which is away from the bottom of the cylinder 300b. In operation, the plunger 310 is displaced from the biased first position by the forces exerted onto the upper portion of the plunger corresponding to the flow direction of the MR fluid as the antenna retracts. The antenna 175 retraction compresses the MR fluid 15 and moves the plunger 310 closer to the bottom of the cylinder 300b. For example, as the antenna 175 retracts into the cavity 211, the MR fluid 15 is pushed down into the bottom of the flow path 201 against the top surface of the plunger 310. This forces the plunger 310 to move into the cylinder 300 and compress the spring 311 therein. The magnetic field (B) is applied (such as by a permanent magnet 225 positioned above the cylinder 300 adjacent the antenna receptacle 200 as shown). In operation, when the MR fluid is in a fluid phase, the plunger 310 in the cylinder 300 moves in a direction away from the inside of the cylinder) because it is spring loaded. The spring 311 forces the plunger 310 back in a direction away from the spring 311 which, in turn, forces the MR fluid 15 back up the flow path 201 to thereby bias the antenna 175 toward the extended position (i.e., automatic antenna deployment). As described above, the magnetic field can be generated at extension to lock or latch the antenna in the operational position.

FIGS. 12 and 13 also illustrate an automatic reset configuration for a latching mechanism 10a for a linearly translating antenna 175. As shown, the automatic reset configuration includes an antenna contact member 285 which linearly retracts when the antenna cap 177 contacts the antenna contact member 285. As shown, the antenna contact member 285 extends a length into the housing 30 along side the antenna receptacle 200. The antenna contact member 285 is disposed to contact a spring-loaded magnet stop 288 wherein the loading is provided by a spring 288a positioned adjacent the magnet 225. The magnet 225 is also attached or operably associated with a spring 226 so that upon depression and relocation of the magnet stop 288, the magnet 225 laterally translates in a direction which brings the magnet 225 closer to the antenna cavity 211. Advantageously, the release button 220 is attached to the magnet 225 such that it also moves outward and is thus automatically reset (de-activated) upon the removal of the magnet stop 288.

In operation, the release button 220 is deployed and the magnet 225 is translated away from the cavity 211 such that it travels over the magnet stop 288, allowing the magnet stop 288 to rise and push the antenna contact member 285 up. The magnet 225 is then held at rest on the other side of the antenna stop 288. Thus, the magnet 225 is moved away from the MR fluid 15 by the depression of the release 220. Once the magnet 225 has cleared the underlying magnet stop 288, the magnet stop 288 springs back up, thereby moving the antenna contact member 285 outward ready for deployment by contact with the antenna cap 177 upon retraction thereof. In reverse, as the antenna 175 retracts into the antenna receptacle 200, the antenna cap 177 depresses the antenna contact member 285 which moves the magnet stop 288 downward. The magnet 225 then translates laterally and resets the release button 220 while positioning the magnet 225 proximate to the cavity 211 providing an automatic reset and an almost instantaneous lock of the retracted antenna 175. The antenna 175 typically deploys a distance of about 80–100 mm, although, of course, this distance can vary depending on the electronics and particular design of the telephone. A half-wave antenna length can be much longer but the length also depends on the frequency band at which the radiotelephone is being operated.

Figure 14:
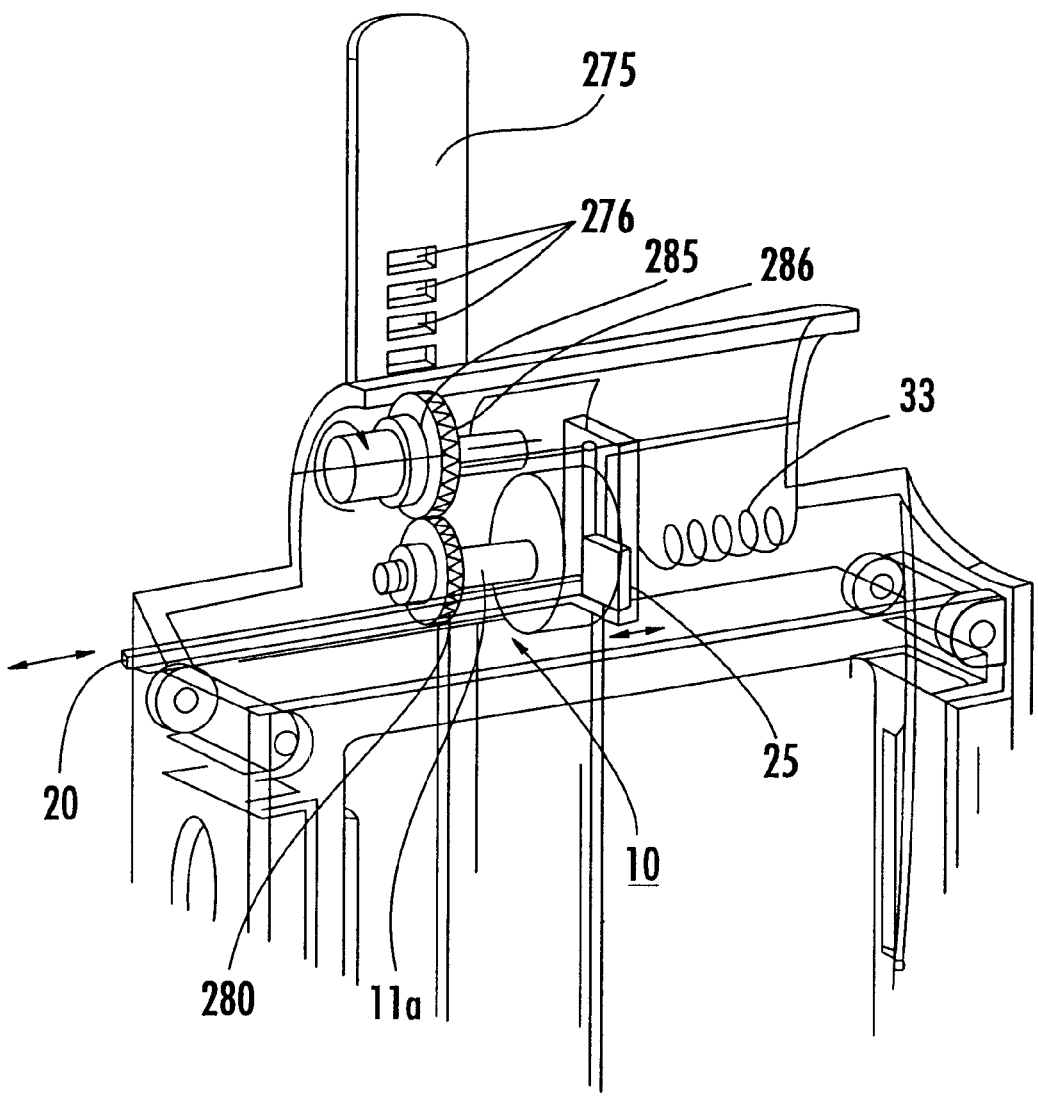
FIGS. 14 is a schematic illustration of an additional embodiment of the present invention for deploying and latching an antenna.

FIG. 14 illustrates another embodiment of the instant invention. As shown, the antenna 275 can be indirectly driven via mechanical components (such as gears) which are controlled (locked or unlocked) by a MR latching mechanism 10. FIG. 14 illustrates the MR latching mechanism 10. The rotating shaft 11a is configured to engage with a clutched lower rotational gear 280 which is mounted to matably engage with an upper rotational gear 285. The gear teeth 286 of the upper gear 285 extend through the pivot cover to engage with the antenna receiving apertures 276. In operation, the MR latching mechanism 10 is unlocked (the magnet 25 is deployed away from the damper body) and the clutch allows the lower gear 280 to rotate in a clockwise direction. The lower gear then mates with the upper gear 285 which rotates in a clockwise direction corresponding to the drive of the lower gear. The antenna receiving apertures 276 receive adjacent portions of the gear teeth 286. The antenna is deployed or extended by the movement of the engaged gear teeth in the receiving apertures (as the upper gear 285 rotates, a gear tooth thereon 286 engages with a receiving aperture 276, rotates a distance and then disengages from the receiving aperture). The antenna 275 then moves a distance upward (the movement corresponding to the engaged distance of the gear tooth 286 in the aperture 276) cooperating with the rotation of the upper gear. In reverse, upon retraction of the antenna 275, the antenna 275 engages with the upper gear 285 which is turned in a counter clockwise direction, which, in turn, also turns the lower gear 280 to allow the antenna to retract. Once retracted, the magnet 25 is repositioned adjacent the MR latching device 10 and the antenna is latched.

Figure 15A:
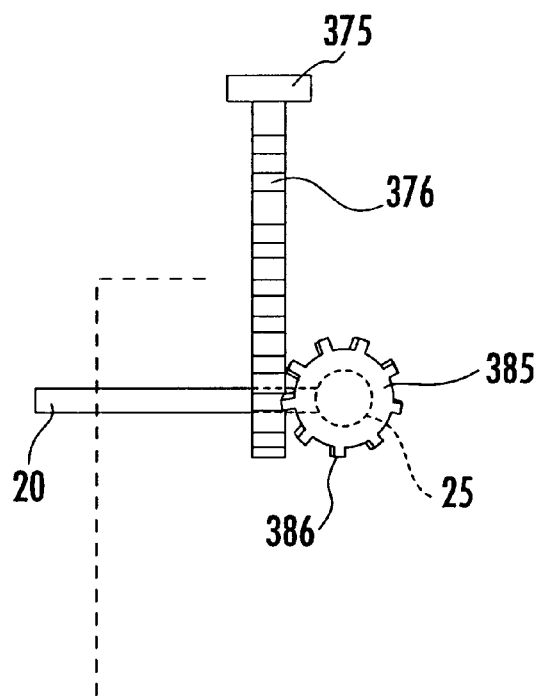
FIGS. 15A, 15B, 15C, and 15D are illustrations of another embodiment of the present invention with indirect deployment or driving/extension and latching of an antenna.
Figure 15B:
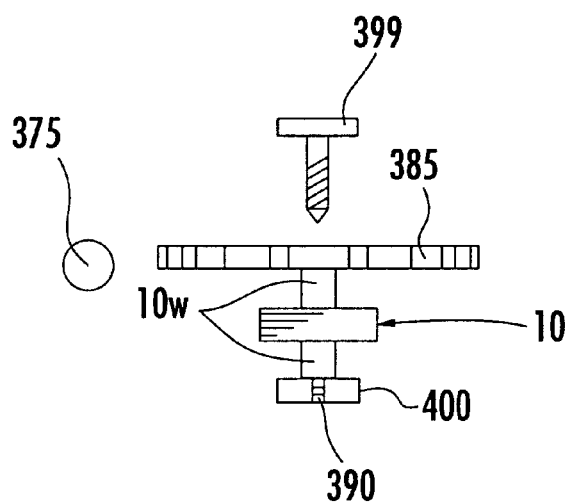
Figure 15C:
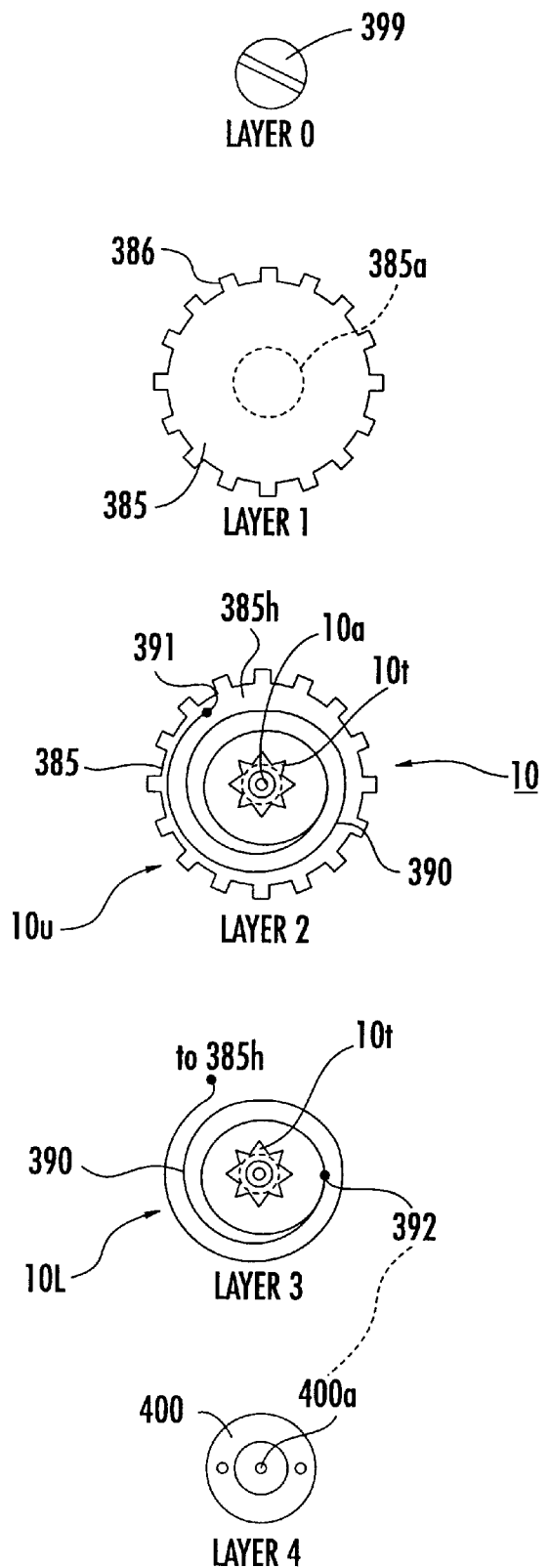

FIGS. 15A, 15B, and 15C illustrate an additional embodiment of a gear driven antenna 375 (or other linearly driven member). As shown, the antenna 375 itself includes grooves or teeth 376 which engage with a spring-loaded gear 385 whose rotation is controlled by a damper latching mechanism 10 such as those described above. The magnet 25 is positioned proximate to the rotational damper latching mechanism 10 (shown in dotted line in FIG. 15A). As shown in FIG. 15B, the damper latch mechanism 10 includes a spring 390 positioned about the damper or latching cavity 11 between the gear 385 and an outer ring 400. The outer ring 400 is fixed to the housing body (not shown). The spring 390 is sized and configured to provide a positive spring-load force to help hold the gear 385 in secure contact with the antenna 375 so as to inhibit slipping between the gear teeth 386 and the mating antenna grooves 376. Preferably, the spring 390 is secured at each opposing end to rotate with the gear 385. As shown in FIG. 15C, a first end of the spring 391 is fixed to the gear 385. The opposing second end 392 is attached to the inside of the damper cavity 111.

FIG. 15C illustrates the gear alone (layer 1), the gear with the damper/latch mechanism 10 and the spring 390 (layer 2), the lower portion of the latching mechanism 10 with the spring 390 shown attached to the inside of the outer ring 400 (layer 3), and the outer ring 400 which is attached to the body of the telephone during assembly (layer 4). Each gear and latch component includes an aligned center aperture 385a, 10a, and 400a which is sized and configured to receive a threaded member 399 such as a screw (FIGS. 15B, 15C) to hold the assembly together. In operation, the magnet 25 is moved away from the damper latching mechanism 10, and the screw 399 is allowed to rotate. The rotation of the spring 390 upon the retraction of the antenna 375 winds the spring 390 between the gear 385 and the damper or latching mechanism 10 which, when unlocked, (moving magnet away) urges the rapid rotation of the gear associated with the unwinding of the coiled spring 390. The rotation of the threaded member 399 turns the gear 385 which advances the antenna 375. Upon retraction of the antenna 375, the gear 385 again winds and loads the spring 390 between the gear and the opposing end of the latching mechanism 10, and the MR fluid is solidified to lock the rotation of the device and retain the antenna in a retracted position. Advantageously, the indirect latching/driving of the antenna can allow easier electrical connections for the antenna operation in the radiotelephone.

Preferably, the spring 390 is attached on one side to the outer gear housing 385h and on the other side to the inner core (chamber) of the latching mechanism 10. As shown in FIG. 15C, the latch mechanism 10 includes an inner core or chamber which is divided into an upper portion 10u (layer two) and a lower portion 101 (layer three), each portion having centrally extending teeth 10t. The lower portion 101 is fastened securely to the outer ring 400 of the telephone and includes a wall surrounding the teeth 10t. The upper portion includes the gear 385, a gear housing 385h, and a wall 10w (FIG. 15B) over the teeth 10t. When assembled, the upper portion 10u engages with the lower portion 101 to hold the magneto-rheological material in a MR chamber formed therebetween.

Figure 15D:
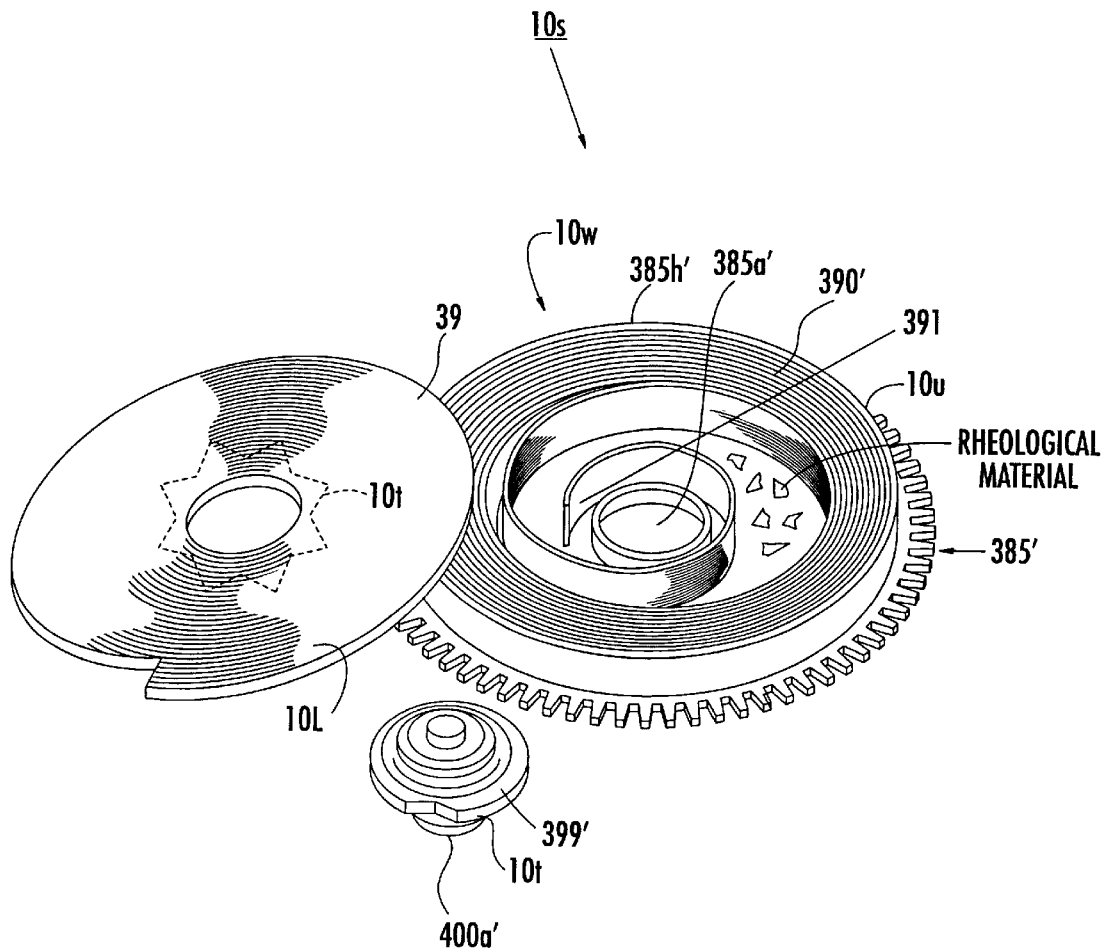

FIG. 15D illustrates one embodiment of a spring-loaded mechanism similar to that discussed for FIGS. 15A–C above. As shown, the upper portion of the latch 10u of the spring-loaded geared latch mechanism 10s includes an outer gear housing 385h' which is a cylindrical chamber with a outer wall 0w which is configured to hold the coiled spring 390' as well as a quantity of rheological material therein. The outer gear housing 385h' holds the gear 385' which when assembled, engages with the antenna 375 (FIG. 15A) as described above. The lower portion of the latch 101 attaches to the lower edge of the outer gear housing 385h' to define the cavity for holding the rheological material and spring 390' in the cylindrical chamber of the upper portion 10u. The lower portion 101 is preferably configured with teeth 10t on the side facing the cavity to provide damping activity for the latch mechanism 10s. A center mounted arbor 399' extends through the assembled upper and lower portions 101, 10u and preferably includes a tooth segment 10t for the upper portion 10u of the latch mechanism 10s. The arbor 399' and the upper and lower portions 10u, 101 thus enclose and seal the rheological material inside the latch mechanism 10s. The lower end of the arbor is threaded to and fixed to the radiotelephone housing. In this embodiment, the rheological material can lubricate the spring to facilitate the spring's 390' coiling and uncoiling in response to the rotation of the outer gear 385'. Alternatively, an inner or core wall can be sized and configured over the teeth region 10t of the upper and lower portions 10u, 101 to separately contain the rheological material along a centrally extending portion of the latch 10s away and separate from the spring 390' (not shown).

The foregoing is illustrative of the present invention and is not to be construed as limiting thereof. Although a few exemplary embodiments of this invention have been described, primarily directed to the magneto-rheological and magnetic field embodiments, those skilled in the art will readily appreciate that many modifications are possible in the exemplary embodiments without materially departing from the novel teachings and advantages of this invention. For example, in lieu or in addition to the permanent magnet, an electric field can be generated between electrodes positioned in proximity to the chamber (with electro-rheological materials therein). Conveniently, the electric field can be easily activated by merely depressing an electric switch to supply the electric input thereto. Such a configuration can provide a less mechanically complex latch (nor requirement to physically translate a permanent magnet) although increased voltages may be needed to generate a desired field strength. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed is:

1. A rotational latch for a radiotelephone with a rotating cover, comprising:
   a housing;
   a rotating member pivotably attached to said housing, said rotating member having a stow position overlying said housing and an open position away from said housing and wherein said rotating member is operably associated with a body portion having a slotted opening formed therein;
   a laterally extending arm having opposing first and second ends, said second end including a protrusion member extending upwardly therefrom positioned proximate to said body portion and configured to be received in said slotted opening and said first end transversely extends a distance out of said housing, wherein said arm is configured to laterally translate from a depressed position to a non-depressed position within said housing; and
   a magneto-rheological latch operably associated with said rotating member and said arm;
   wherein when said rotating member is in said stow position, said slotted opening aligns with said arm protrusion member and said protrusion member advances therein to transversely return said first end to an outwardly extending position and lock said rotating member in the stow position, and wherein upon depression of said first end arm, said second end translates out of said slotted opening and said rotating member is free to rotate relative to said housing.

2. A rotational latch for a radiotelephone according to claim 1, wherein said arm second end is attached to a magnet which moves toward and away from said latch in response to the transverse movement of said arm.

3. An antenna latching mechanism for a linearly translatable antenna translatable between a retracted position and an extended position, comprising:
   an antenna configured to linearly translate between retracted and extended positions;
   an antenna receptacle, said receptacle defining a fluid chamber and being sized and configured to receive a major portion of said antenna therein when said antenna is in a retracted position;
   a damper having an external surface in fluid communication with said antenna receptacle, wherein said damper has a biased first position corresponding to the substantial absence of external forces acting thereon, and wherein said damper travels inward away from said biased first position in response to forces introduced onto said external surface upon retraction of said antenna into said antenna receptacle;
   a quantity of rheological fluid disposed in said receptacle; and
   field generating means operably associated with said rheological fluid configured to generate a field proximate to said rheological fluid, wherein said translatable antenna is latched in said retracted position in response to the field applied proximate to said rheological fluid in said receptacle.

4. An antenna latching mechanism according to claim 3, wherein said quantity of rheological fluid comprises magneto-rheological fluid, said device further comprising an externally accessible release operably associated with the field generating means, and wherein the field generating means is a magnetic field generating means.

5. An antenna latching mechanism according to claim 4, further comprising an automatic magnet position reset operably associated with said magnetic field generating means.

6. An antenna latching mechanism according to claim 5, wherein said rheological fluid comprises magneto-rheological fluid, and wherein said field generating means is a permanent magnet operably associated with a spring to bias said magnet toward an unloaded first position, and wherein said automatic magnet position reset comprises:
   an antenna contact member having opposing first and second ends with a longitudinal length, said first end configured to contact said antenna when said antenna is retracted into said receptacle; and
   a spring-loaded magnet stop operably associated with said antenna contact member second end and configured to contact said magnet to prevent lateral movement of said magnet in the direction of said release.

7. An antenna latching mechanism according to claim 6, wherein said antenna is automatically deployed upward toward said extended position upon removal of the magnetic field from the proximity of said receptacle, and wherein said automatic deployment is facilitated by the return of said damper to said biased first position.

8. A latching mechanism for a linearly translatable member moveable between an a retracted position and an extended position, comprising:
   a translatable member configured to linearly translate between retracted and extended positions;
   a translatable member receptacle, said receptacle defining a fluid chamber and being sized and configured to receive at least a major portion of the length of said translatable member therein when said translatable member is in a retracted position, wherein said receptacle includes a flow channel in fluid communication with said fluid chamber;
   a quantity of rheological fluid disposed in said receptacle; and
   field generating means operably associated with said rheological fluid configured to generate a field proximate to said rheological fluid, wherein said translatable member is latched in said retracted position in response to the field applied proximate to said rheological fluid in said receptacle.

9. A latching mechanism according to claim 8, wherein said rheological material is magneto-rheological material and said field generating means is a magnetic field generating means, and wherein said translatable member has first and second opposing ends, and wherein when said translatable member is in said retracted position, said channel is sized and configured to direct a quantity of said magnetorheological fluid from below said translatable member second end to above said translatable second end.

10. A latching mechanism according to claim 9, wherein said receptacle has a length and said channel is configured with upper and lower openings formed onto said receptacle to define a flow path which extends above and below said translatable member second end when said translatable member is in said retracted position.

11. A latching mechanism according to claim 8, wherein said flow channel is in fluid communication with a resiliently configured reservoir.

12. An antenna deployment and latching mechanism, comprising:
    a first rotatable gear having circumferentially extending gear teeth thereon;
    a longitudinally retractable and extendable antenna positioned proximate to said first rotatable gear, said antenna including a surface which is configured to matably receive said gear teeth;
    a latching mechanism operably associated with said rotatable gear, said latching mechanism having a cavity;
    a quantity of rheological material disposed in said cavity; and
    a field source operably associated with said rheological material, wherein said rotatable gear is inhibited from rotating in response to one or more of a magnetic and electric field generated proximate to said rheological material in said cavity, and wherein said rotatable gear is free to rotate in the absence of the field introduced proximate to said rheological material in said cavity.

13. An antenna deployment and latching mechanism according to claim 12, said mechanism further comprising a rotational spring having opposing first and second end portions, said first end portion affixed to said gear, and said second end fixed to a substantially stationary member such that said spring first end rotates corresponding to the rotation of said gear to thereby produce variable spring forces.

14. An antenna deployment and latching mechanism according to claim 13, wherein said antenna is translated toward the extended position by the spring load exerted onto said gear by said rotational spring.

15. An antenna deployment and latching mechanism according to claim 12, wherein said mechanism further comprises a second rotatable gear operably associated with said first rotatable gear and said latching mechanism.

16. A portable communication device with a latching mechanism, comprising:
    a primary housing;
    a translating antenna having a stowed position and an extended position;
    an antenna receptacle positioned in said housing, said receptacle defining a fluid chamber and being sized and configured to receive a major portion of said antenna therein when said antenna is in a stowed position, wherein said receptacle includes an overflow channel in fluid communication with said fluid chamber;
    a quantity of rheological fluid disposed in said receptacle; and
    field generating means operably associated with said rheological fluid configured to generate a field proximate to said rheological fluid, wherein said antenna is latched in said stowed position in response to the field applied proximate to said rheological fluid in said receptacle.

17. A portable communication device according to claim 16, said antenna further comprising opposing first and second ends defining a longitudinal axis therebetween, wherein said antenna second end is configured to be contained within said receptacle in both said stowed and extended positions, and wherein said receptacle has a length and said overflow channel is configured with upper and lower openings formed onto said receptacle to define a flow path which extends above and below said antenna second end when said antenna is in said stowed position.

18. A portable communication device according to claim 17, wherein upon retraction of said antenna into said stowed position, said overflow channel is sized and configured to direct a quantity of said rheological fluid from below said antenna second end to above said antenna second end.

19. A portable communication device according to claim 18, wherein said receptacle comprises an elbow which is sized and configured to hold an amount of rheological fluid with a viscosity which is sufficient to dampen the translation of said antenna as it moves toward said extended position in the absence of the field proximate thereto.

20. A portable communication device according to claim 16, wherein said rheological material is magneto-rheological material and said field is a magnetic field, said device further comprising a latch release attached to said magnetic field generating means for controlling the introduction and removal of the magnetic field to said magneto-rheological material.

21. A portable communication device according to claim 20, wherein said magnetic field generating means is at least one permanent magnet, and wherein said magnet is configured to translate from a position proximate to said receptacle to a second position away from said receptacle in response to activation of said latch release.

22. A portable communication device according to claim 20, wherein said magnetic field generating means is at least one permanent magnet, and wherein said latch release is configured as a laterally extending shaft with an externally accessible portion.

23. A portable communication device according to claim 22, further comprising a longitudinally extending reset component operably associated with said latch release, wherein as said antenna translates toward said stowed position, said reset component translates a longitudinal distance into said housing and allows said latch release to return to a deactivated position.

24. A portable communication device according to claim 20, wherein said latch release is automatically reset upon translation of said antenna toward said stowed position.

25. A portable communication device according to claim 16, wherein said overflow channel is in fluid communication with a resiliently configured reservoir.

26. A portable communication device with a latching mechanism, comprising:
    a housing;
    a rotating member pivotably attached to said housing, said rotating member having a first closed position and a second open position;
    a latching mechanism operably associated with said rotating member, said latching mechanism having a cavity;
    a quantity of rheological material disposed in said cavity; and
    a field source operably associated with said rheological material, wherein said rotating member is inhibited from rotation in response to a field generated proximate to said rheological material in said cavity, and wherein said rotating member is free to rotate in the absence of the field introduced proximate to said rheological material in said cavity.

27. A portable communication device according to claim 26, wherein said latching mechanism comprises:
   a rotatable shaft having opposing first and second end portions, said first end portion laterally extending a distance out of said cavity, and said second end portion disposed in said cavity; and
   an internal cavity member having frictional surfaces attached to said rotatable shaft second end portion wherein the field source is a magnetic field source, and, wherein in response to the generation of the magnetic field, a magneto-rheological fluid contacts said frictional surfaces and inhibits said rotatable shaft from rotating.

28. A portable communication device according to claim 26, wherein said magnetic field source is a permanent magnet positioned in said housing, and wherein said permanent magnet is translatable between a first position proximate to said cavity and a second position away from said cavity.

29. A portable communication device according to claim 28, wherein said device further comprises an externally accessible laterally extending release operably associated with said magnet.

30. A portable communication device according to claim 29, wherein said release is configured in said housing such that said release is automatically repositioned from an inward depressed position to an outward non-depressed position in response to the translation of said rotating member toward said closed position.

31. A portable communication device according to claim 26, wherein in response to generation of a magnetic field proximate to said cavity, said latching mechanism precludes rotation of said rotatable member from both said first and second positions.

32. A portable communication device according to claim 26, wherein said rotating member is a low-profile flip and wherein said flip overlays said housing in said closed position.

33. A portable communication device according to claim 32, further comprising a blade antenna attached to said housing, said antenna having a closed position wherein said antenna substantially overlies said housing and an open position, and wherein said latching mechanism is configured to latch both said antenna and said low-profile flip in the closed position.

34. A portable communication device according to claim 33, wherein the field source is a magnetic field source comprising a pair of translatable permanent magnets positioned in said housing.

35. A portable communication device according to claim 34, wherein said pair of translatable magnets are operably associated with an externally accessible laterally extending release.

36. A portable communication device according to claim 26, wherein said rotating member is a rotatable antenna.

37. A portable communication device according to claim 36, wherein the field source is a magnetic field source is at least one permanent magnet, and said device further comprises a longitudinally extending externally accessible release positioned proximate to said magnet and configured to extend out from one edge of said device, and wherein upon depression of said release, said permanent magnet is relocated and said antenna is free to rotate.

38. A latching mechanism, comprising:
   a rotating shaft having opposing first and second end portions;
   an internal cavity member having a plurality of exposed frictional surfaces attached to said rotating shaft second end portion, wherein said rotating shaft first end portion laterally extends a distance out of said cavity and said second end portion is disposed within said cavity;
   a quantity of rheological fluid disposed in said internal cavity; and
   a field source configured to supply and remove one or more of an electric and magnetic field proximate to said rheological fluid, wherein in response to the application of the field said rheological fluid contacts said frictional surfaces and inhibits said rotatable shaft from rotating.

39. A latching mechanism according to claim 38, wherein said rotating shaft defines a rotational axis, and wherein said frictional surfaces are a plurality of protrusions which radially extend outward a distance away from said rotational axis.

40. A latching mechanism according to claim 39, wherein said frictional surfaces and the viscosity of said rheological fluid act to provide a damping force when said rotational shaft is rotating.

* * * * *

UNITED STATES PATENT AND TRADEMARK OFFICE
CERTIFICATE OF CORRECTION

PATENT NO. : 6,353,733 B1
DATED : March 5, 2002
INVENTOR(S) : Murray et al.

It is certified that error appears in the above-identified patent and that said Letters Patent is hereby corrected as shown below:

<u>Title page,</u>
Item [56], References Cited, U.S. PATENT DOCUMENTS, add:

| | | | |
|---|---|---|---|
| -- 4,923,057 | 05/08/90 | Carlson et al. | 188/378 |
| 4,992,190 | 02/12/91 | Shtarkman | 252/62.52 |
| 5,075,023 | 12/24/91 | Fukuyama et al. | 252/74 |
| 5,087,382 | 02/11/92 | Ishino et al. | 252/73 |
| 5,139,691 | 08/18/92 | Bloink et al. | 252/74 |
| 5,167,850 | 12/01/92 | Shtarkman | 252/62.52 |
| 5,257,681 | 11/02/93 | Shtarkman et al. | 188/267 |
| 5,277,281 | 01/11/94 | Carlson et al. | 188/267 |
| 5,284,330 | 02/08/94 | Carlson et al. | 267/140.14 |
| 5,573,088 | 11/12/96 | Daniels | 188/267 |
| 5,652,704 | 07/29/97 | Catanzarite | 364/424.059 |
| 5,693,004 | 12/02/97 | Carlson et al. | 601/23 |
| 5,704,579 | 01/06/98 | Celentino et al. | 248/311.2 |
| 5,749,807 | 05/12/98 | Webb | 482/52 -- |

Item [56], OTHER PUBLICATIONS, add:

-- Brochure, *Welcome to Lord Corporation's Rheonetic*™ *Magnetic Fluids and Systems Website;* Rheonetic™ Magneto-Rheological Fluid Technology, http://www.rheonetic.com/mrfluid/, 2 pages (printed from website on 1/19/99).
Brochure, *The Technology Within;* Rheonetic™ Magneto-Rheological Fluid Technology, http://www.rheonetic.com/mrfluid/technology.html, 4 pages (printed from website on 1/19/99).

Brochure, *Controllable MR Fluid Dampers,* Rheonetic™ Magneto-Rheological Fluid Technology, http://www.rheonetic.com/mrfluid/damper.html, 3 pages (printed from website on 1/19/99). --

Signed and Sealed this

Twenty-fourth Day of December, 2002

JAMES E. ROGAN
*Director of the United States Patent and Trademark Office*